United States Patent
Yamashita

(10) Patent No.: US 11,262,337 B2
(45) Date of Patent: Mar. 1, 2022

(54) CHROMATOGRAPHY MASS SPECTROMETRY AND CHROMATOGRAPHY MASS SPECTROMETER

(71) Applicant: HITACHI HIGH-TECH CORPORATION, Tokyo (JP)

(72) Inventor: Hiromichi Yamashita, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 0 days.

(21) Appl. No.: 16/980,455

(22) PCT Filed: Mar. 5, 2019

(86) PCT No.: PCT/JP2019/008683
§ 371 (c)(1),
(2) Date: Sep. 14, 2020

(87) PCT Pub. No.: WO2019/176658
PCT Pub. Date: Sep. 19, 2019

(65) Prior Publication Data
US 2021/0048417 A1 Feb. 18, 2021

(30) Foreign Application Priority Data
Mar. 14, 2018 (JP) .............................. JP2018-046194

(51) Int. Cl.
*G01N 30/86* (2006.01)
*G01N 30/72* (2006.01)
*H01J 49/04* (2006.01)

(52) U.S. Cl.
CPC ..... *G01N 30/8631* (2013.01); *G01N 30/7233* (2013.01); *H01J 49/0431* (2013.01)

(58) Field of Classification Search
CPC .......... G01N 30/8631; G01N 30/7233; G01N 30/8624; G01N 30/72; G01N 27/62; G01N 30/86; H01J 49/0431
(Continued)

(56) References Cited

U.S. PATENT DOCUMENTS 4,752,888 A * 6/1988 Yoshihara ............ G06K 9/0053
702/32
4,941,101 A * 7/1990 Crilly ................. G01N 30/8624
702/32
(Continued)

FOREIGN PATENT DOCUMENTS

| JP | 61-145457 A | 7/1986 |
| JP | 61-181961 A | 8/1986 |

(Continued)

OTHER PUBLICATIONS

International Preliminary Report on Patentability received in corresponding International Application No. PCT/JP2019/008683 dated Sep. 24, 2020.
(Continued)

*Primary Examiner* — David A Vanore
(74) *Attorney, Agent, or Firm* — Mattingly & Malur, PC

(57) ABSTRACT

Provided is a chromatography mass spectrometry capable of peak detection that can deal with a wide concentration range of a sample component and providing an evaluated value for the result. A plurality of samples having different known concentrations of a component are measured to detect a start point, an apex, and an end point of a peak. Regarding the start point, the apex, and the end point of the detected peak, an evaluated value such as probability is provided as a score to determine a score function. A component having an unknown concentration is measured to detect a start point, an apex, and an end point of a peak. Regarding the start point, the apex, and the end point of the detected peak, the (Continued)

score function is applied to evaluate peak detection results, and a result having a high evaluated value is selected as a peak.

8 Claims, 15 Drawing Sheets

(58) Field of Classification Search
USPC .......................................... 250/282, 287, 290
See application file for complete search history.

(56) References Cited

U.S. PATENT DOCUMENTS

| | | | | |
|---|---|---|---|---|
| 2003/0229451 A1* | 12/2003 | Hamilton | ............... | G16B 50/00 |
| | | | | 702/19 |
| 2005/0230616 A1* | 10/2005 | Cameron | ............. | G01N 27/624 |
| | | | | 250/287 |
| 2007/0029477 A1* | 2/2007 | Miller | ................ | G01N 30/7206 |
| | | | | 250/290 |
| 2011/0093204 A1* | 4/2011 | Zucht | ................. | C07K 14/4711 |
| | | | | 702/19 |
| 2012/0116689 A1* | 5/2012 | Heinje | ................... | G16C 20/80 |
| | | | | 702/25 |
| 2013/0116934 A1* | 5/2013 | Yamada | ................ | H01J 49/004 |
| | | | | 702/28 |
| 2016/0252484 A1* | 9/2016 | Rubinstein | ............. | G16H 50/50 |
| | | | | 702/19 |
| 2017/0336370 A1* | 11/2017 | Noda | .................. | G01N 30/8631 |
| 2019/0130994 A1* | 5/2019 | Ruderman | ............. | G16B 20/20 |
| 2021/0048417 A1* | 2/2021 | Yamashita | ......... | G01N 30/7233 |

FOREIGN PATENT DOCUMENTS

| | | |
|---|---|---|
| JP | 63-151851 A | 6/1988 |
| JP | 2012-163475 A | 8/2012 |
| JP | 2016-133486 A | 7/2016 |

OTHER PUBLICATIONS

International Search Report of PCT/JP2019/008683 dated May 14, 2019.

* cited by examiner

[FIG. 1]
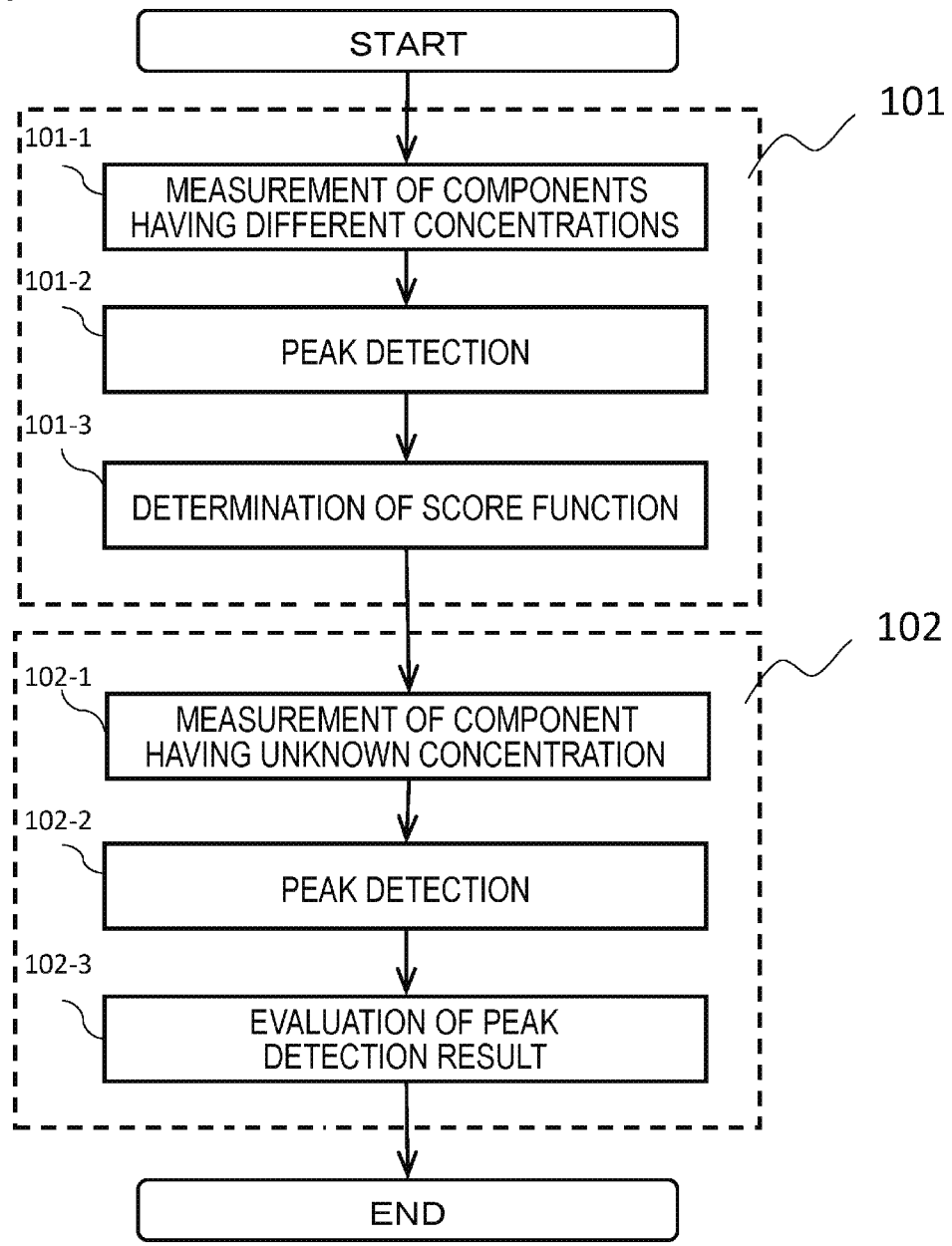

[FIG. 2]
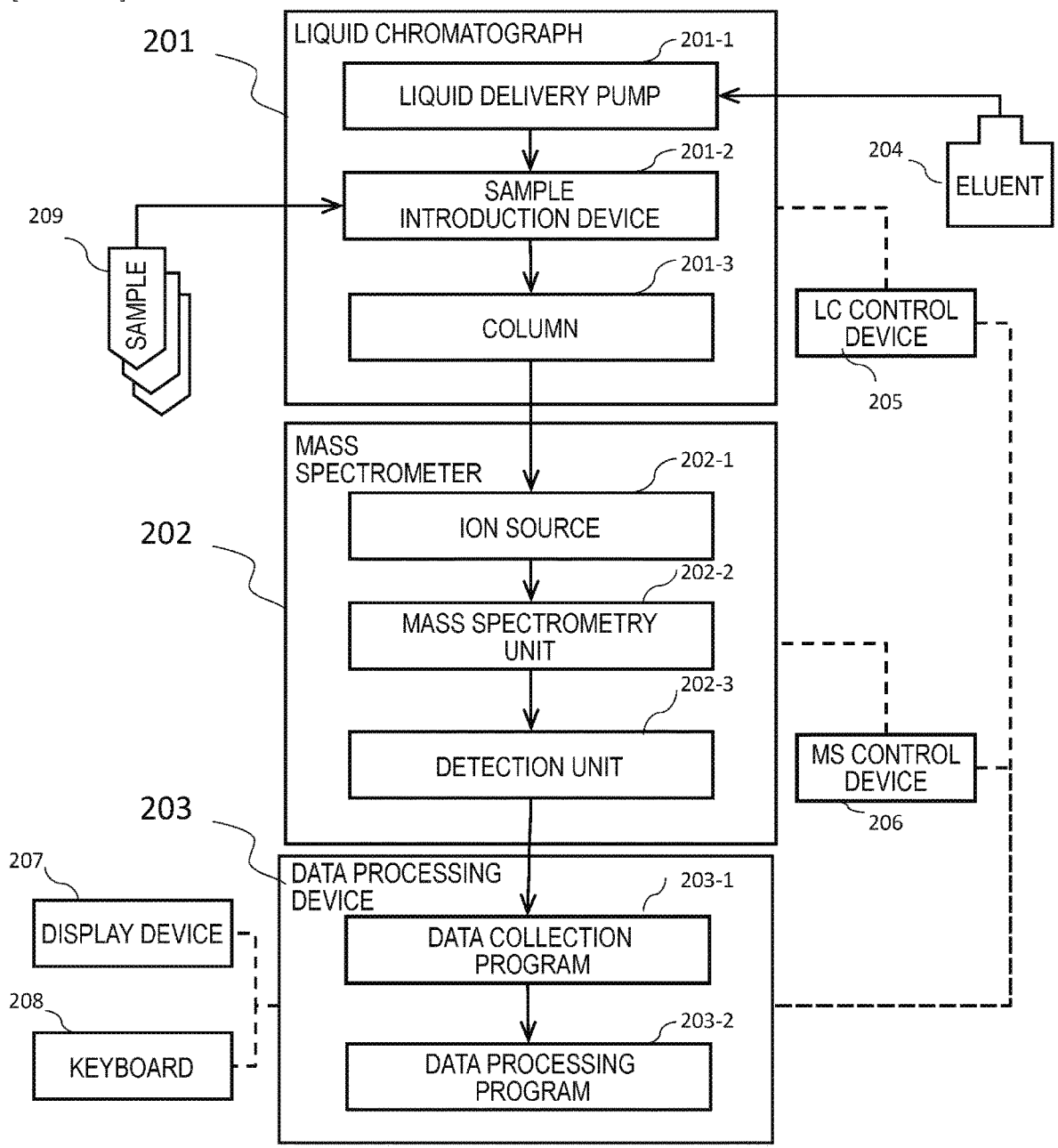

[FIG. 3]
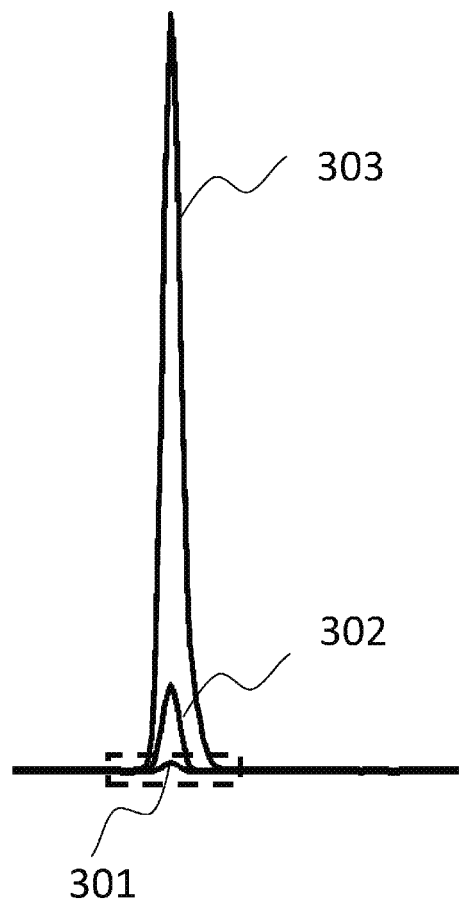
[FIG. 4]
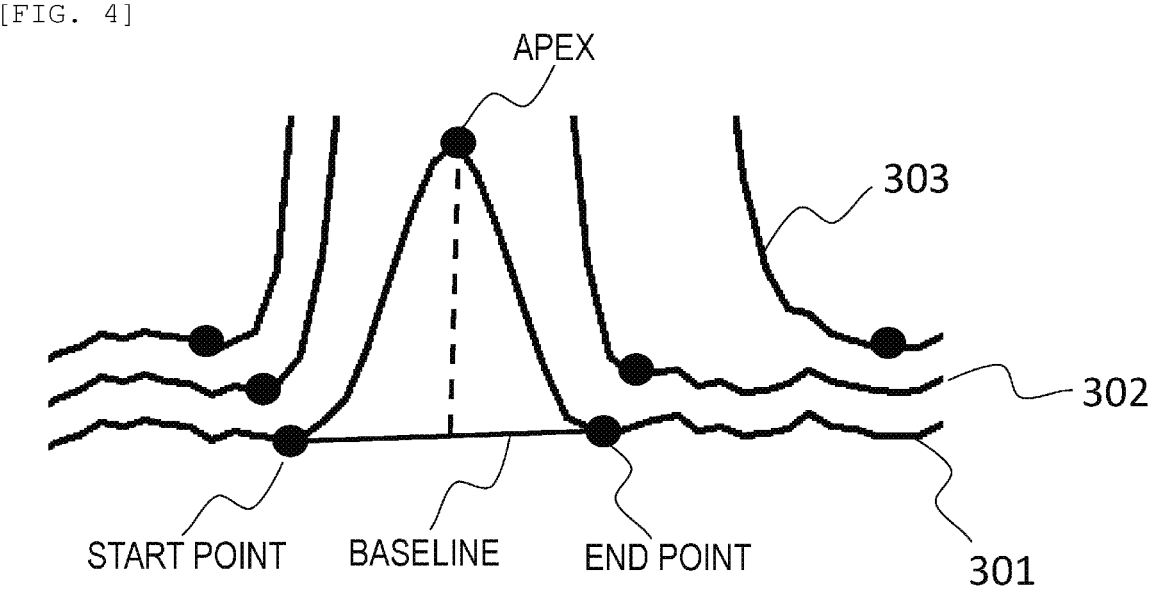

[FIG. 5A]
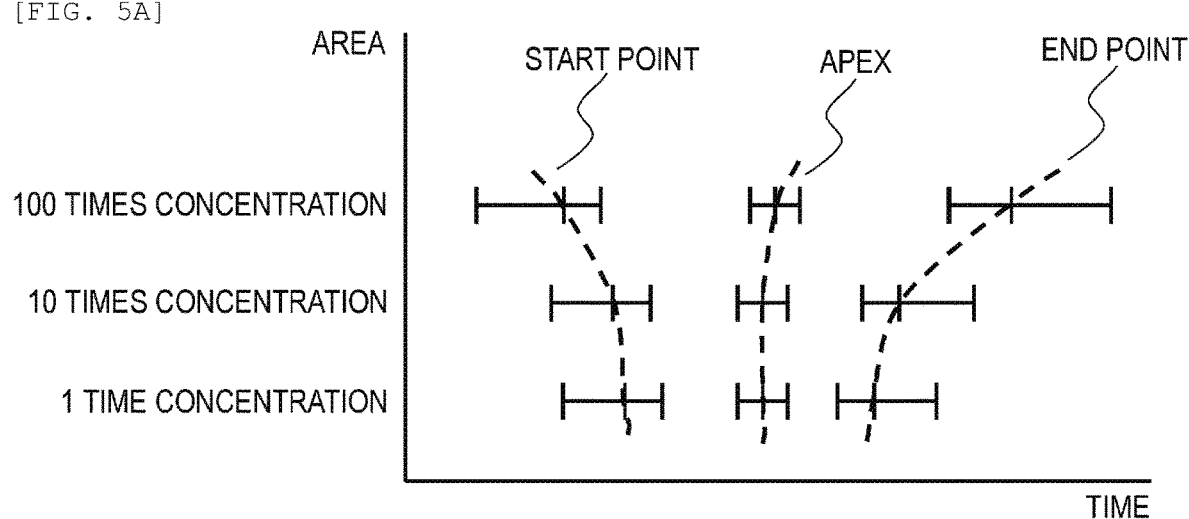
[FIG. 5B]
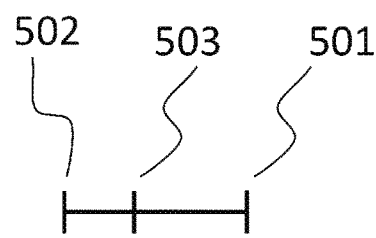

[FIG. 6]
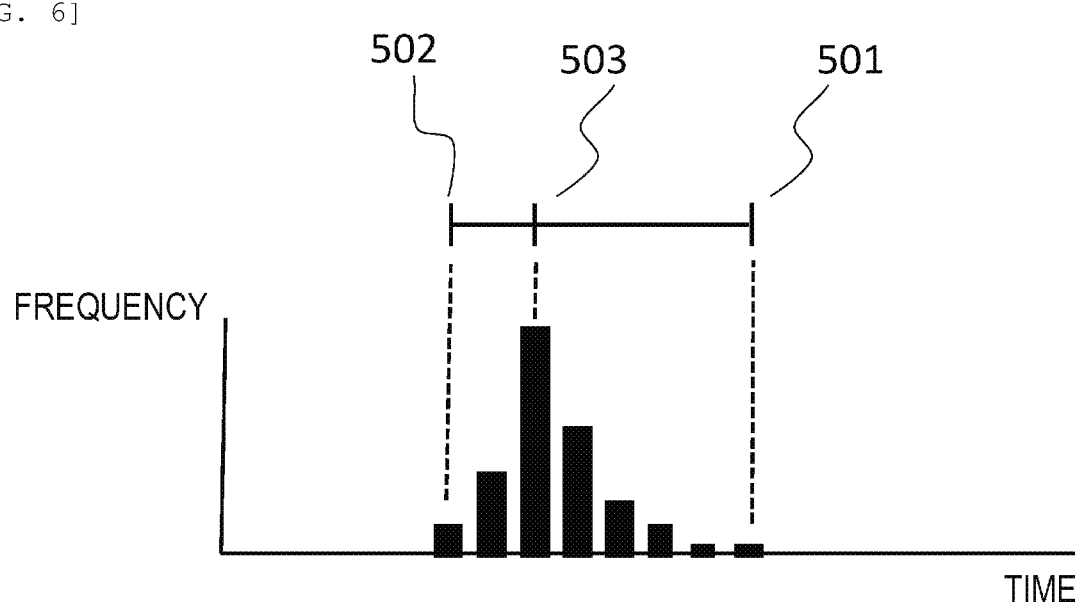

[FIG. 7A]
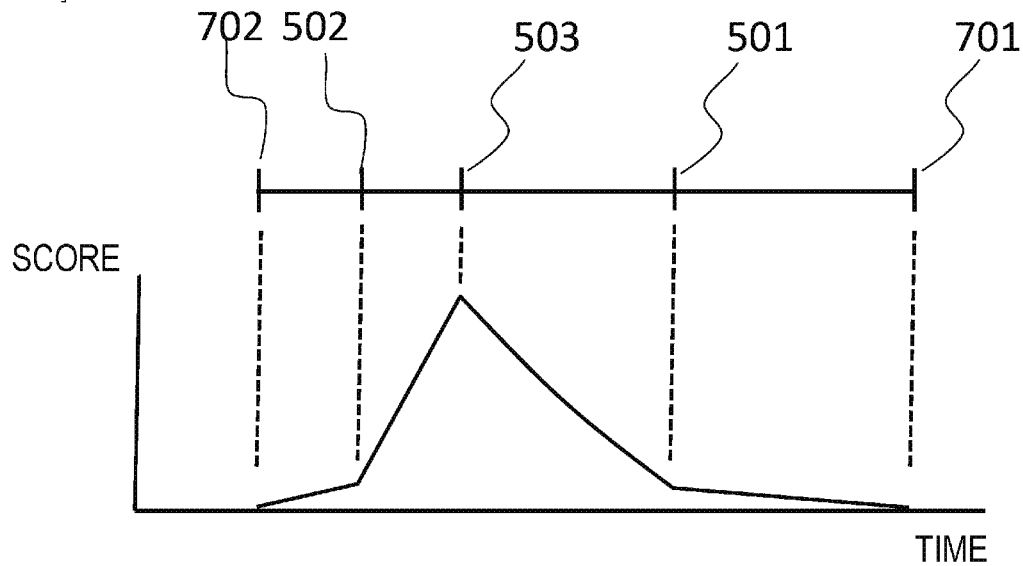
[FIG. 7B]
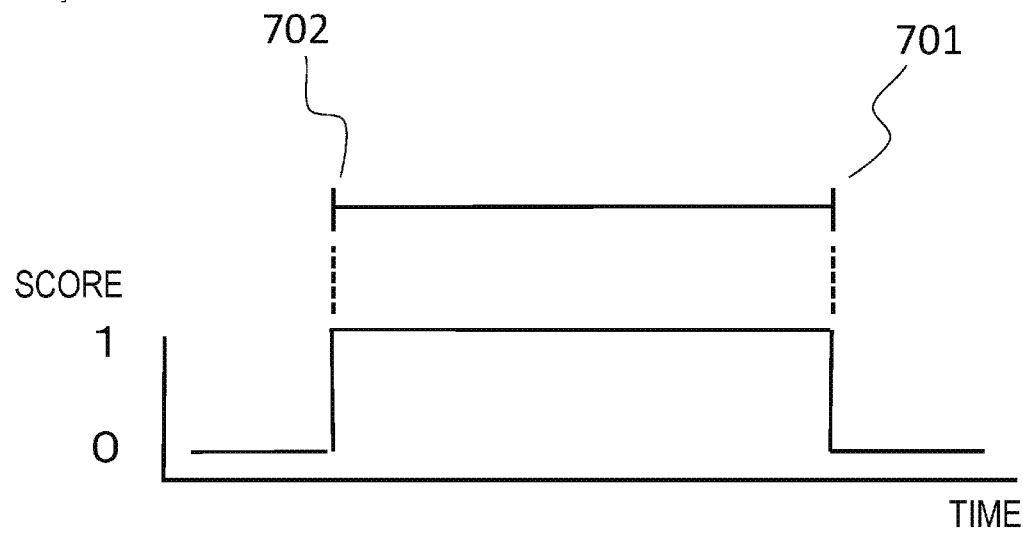

[FIG. 8A]
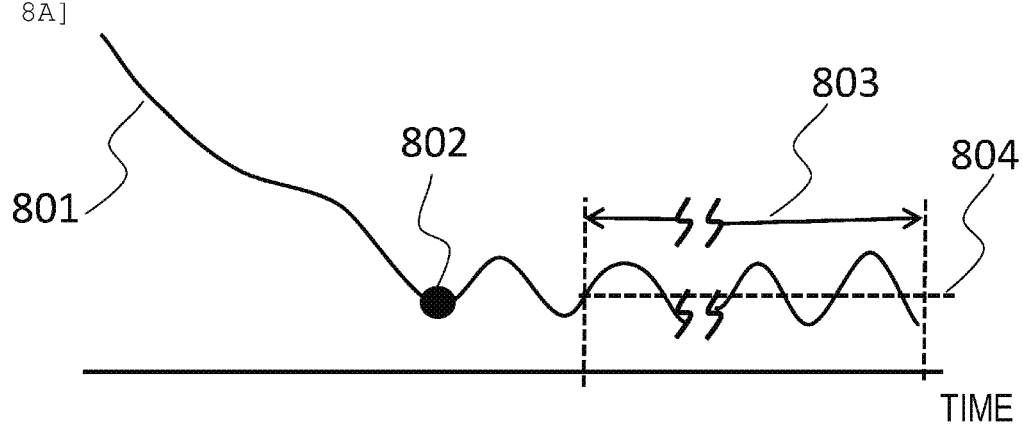
[FIG. 8B]
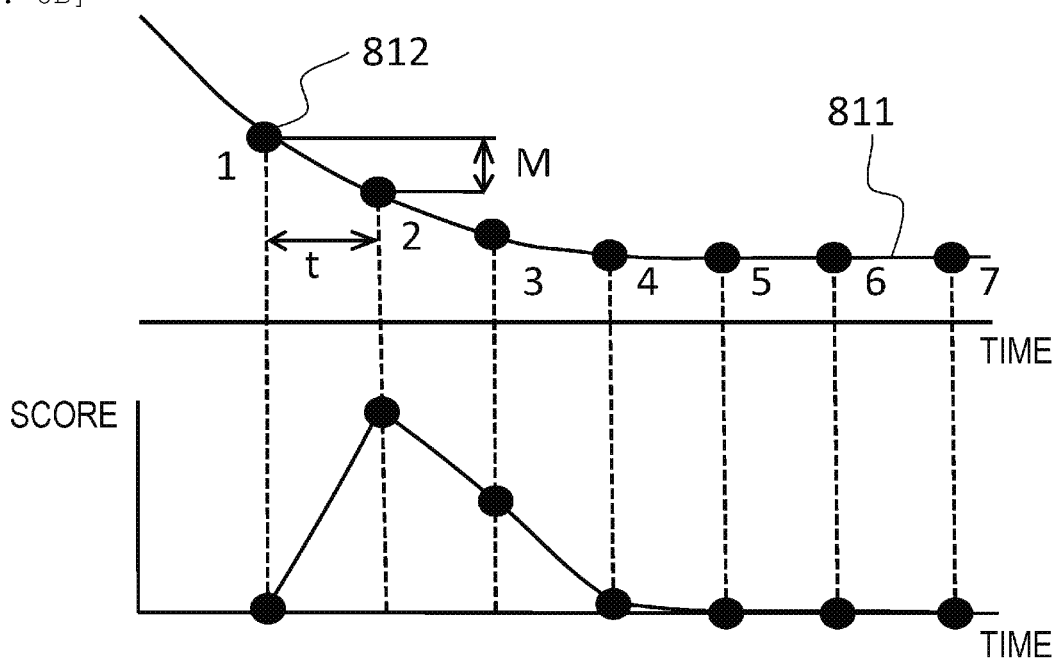
[FIG. 8C]
| No. | 1 | 2 | 3 | 4 | 5 | 6 | 7 |
|---|---|---|---|---|---|---|---|
| D | 10 | 5 | 3 | 2 | 1 | 0 | 0 |
| ΔD | 5 | 2 | 1 | 1 | 1 | 0 | 0 |
| p | 0 | 0.6 | 0.8 | 0.8 | 0.8 | 1 | 0 |
| S | 0 | 0.6 | 0.32 | 0.064 | 0.0128 | 0.0032 | 0 |

[FIG. 9]
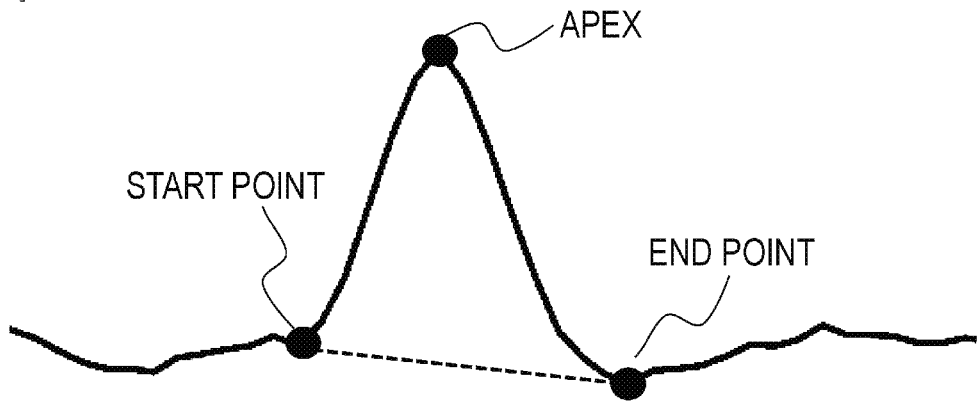
[FIG. 10]
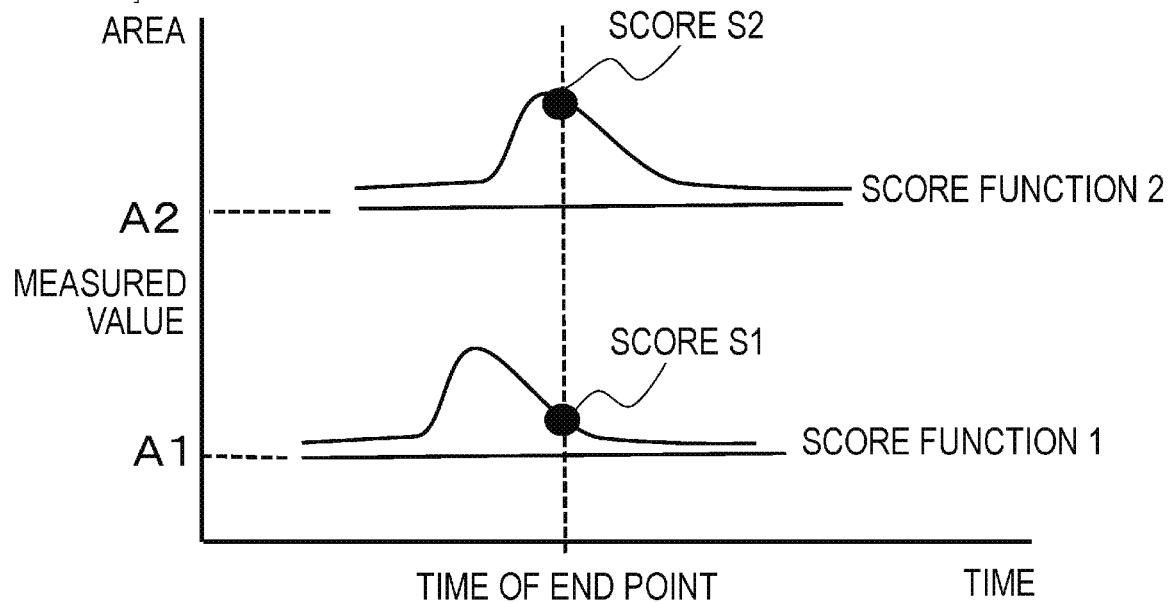
[FIG. 11]
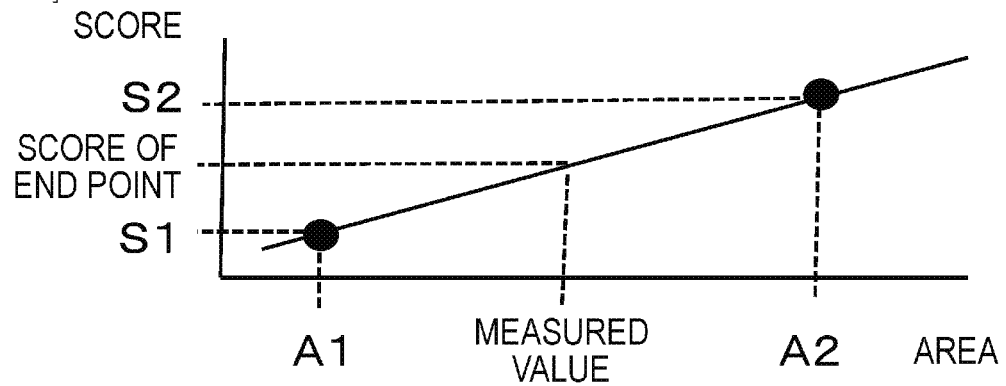

[FIG. 12]
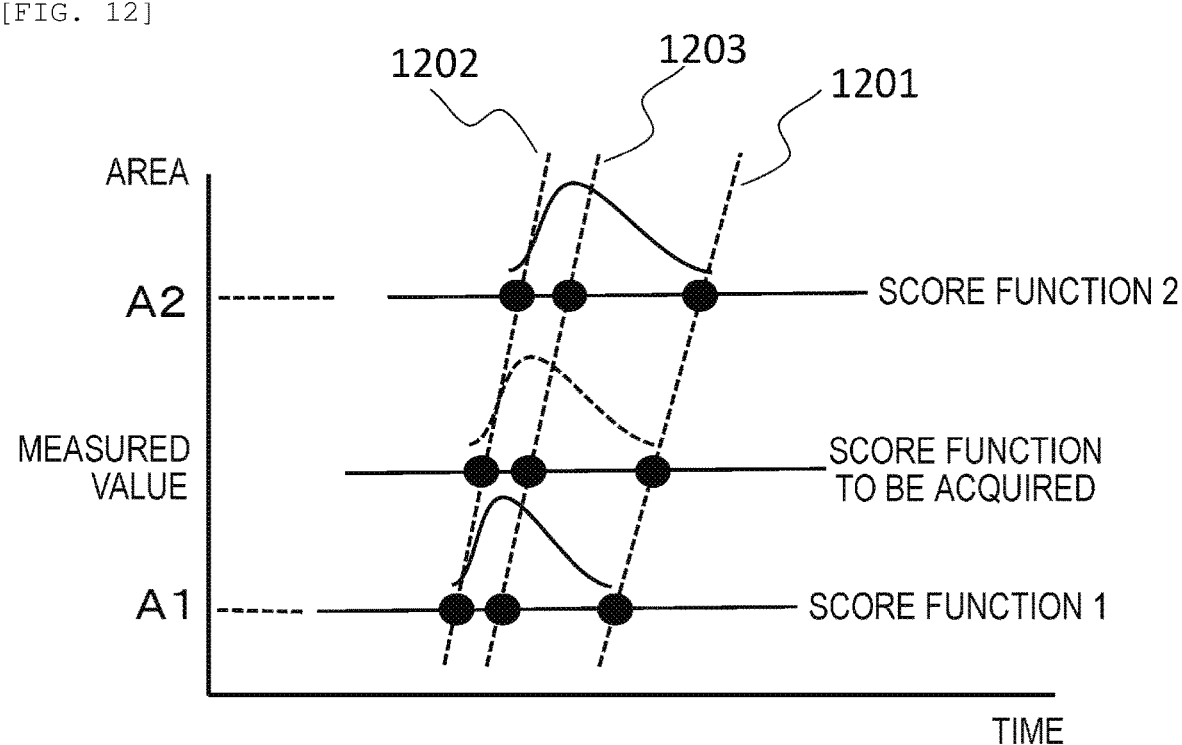
[FIG. 13]
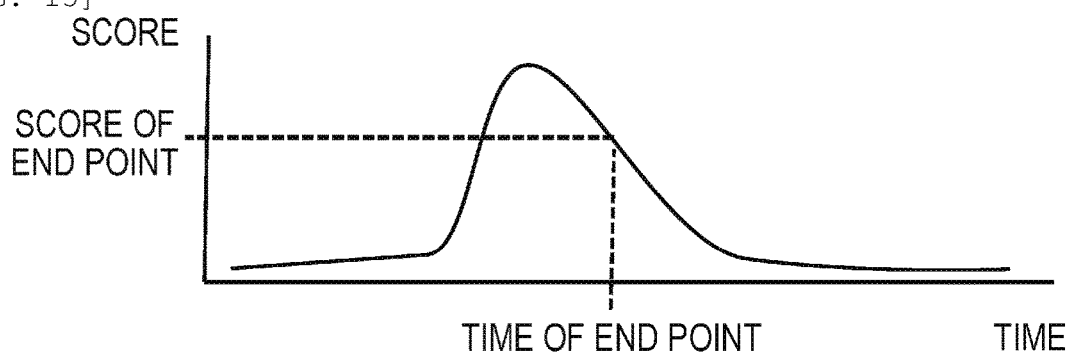

[FIG. 14A]
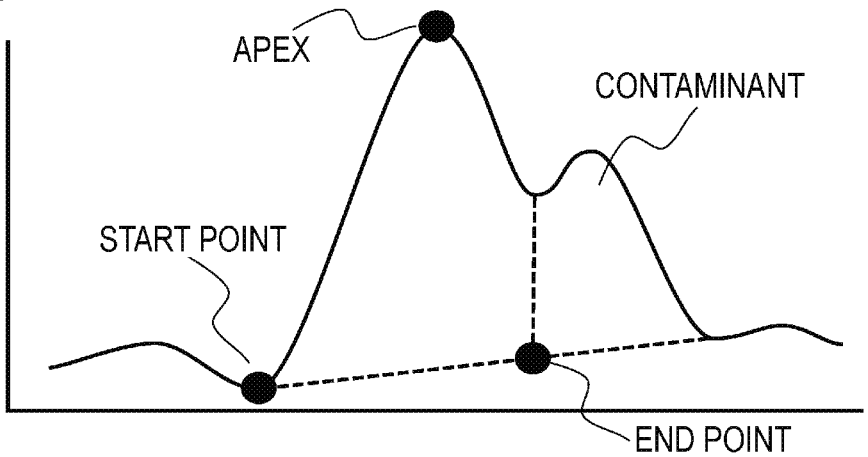
[FIG. 14B]
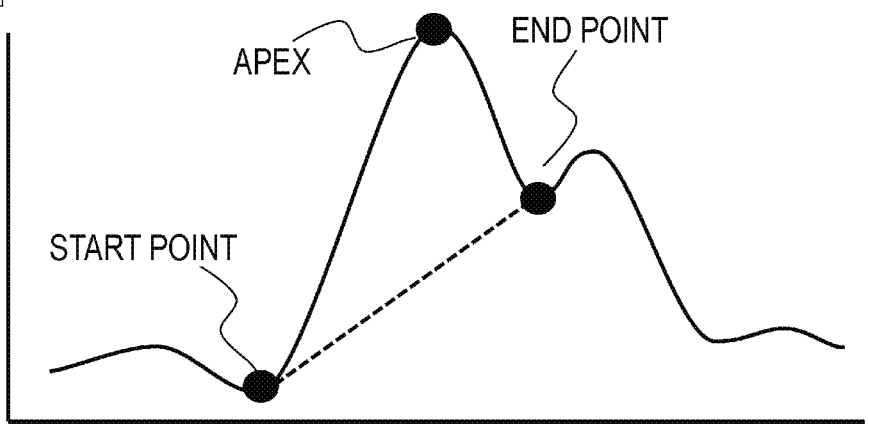
[FIG. 14C]
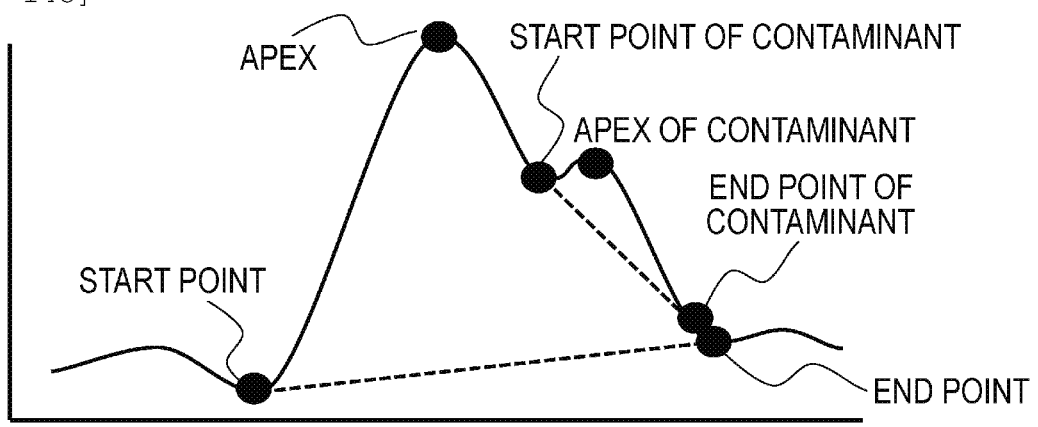

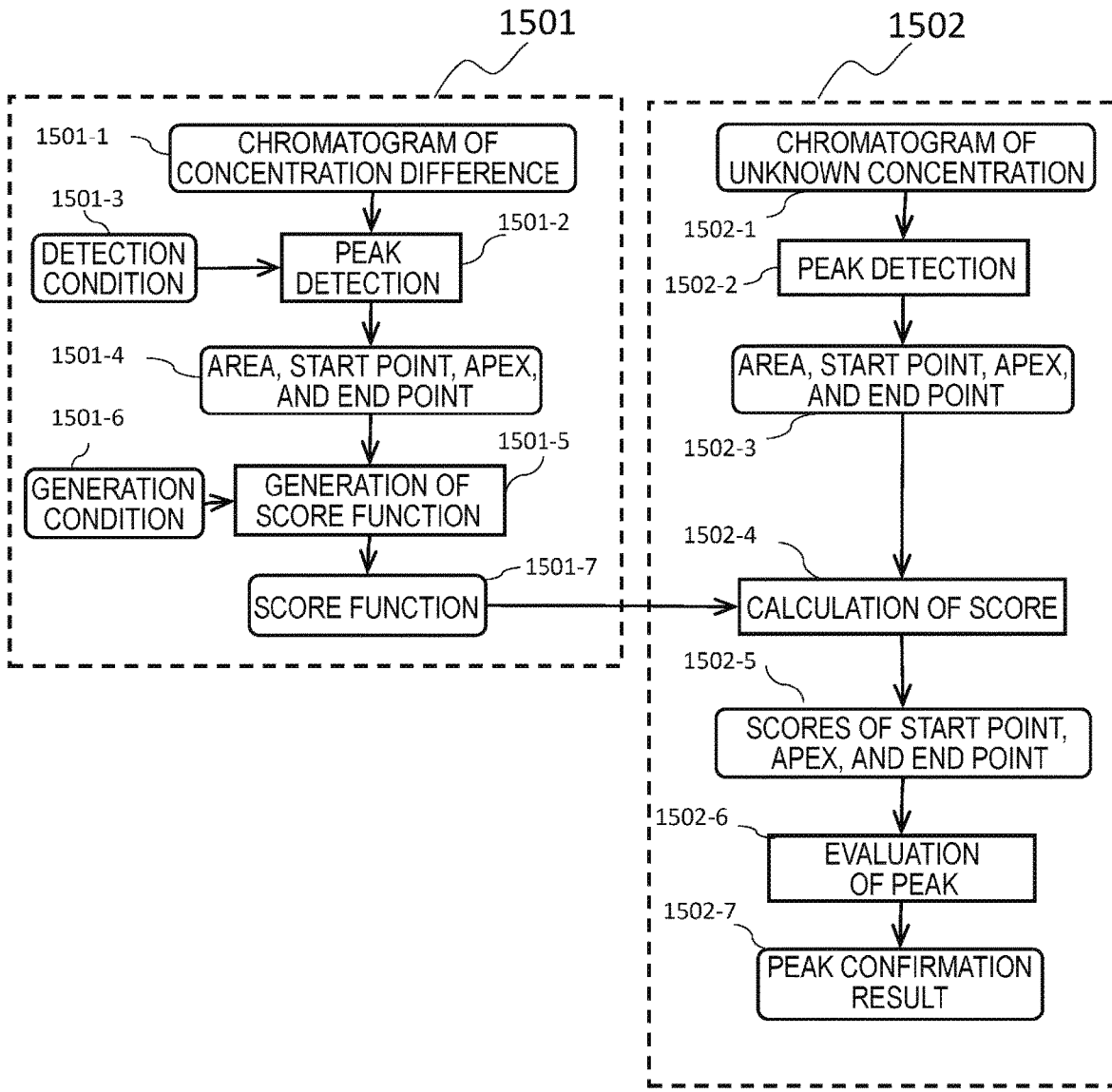
[FIG. 15]

[FIG. 16]

PEAK DETECTION CONDITION SETTING

TIME RANGE (min) 3.5 — 4.5

NOISE WIDTH 150

[FIG. 17]

SCORE FUNCTION GENERATION CONDITION SETTING (END POINT)

TYPE ◉ SCORE ○ PROBABILITY ○ RELEVANT/IRRELEVANT

SCORE

MAXIMUM FREQUENCY TIME 100

MINIMUM TIME 10

MAXIMUM TIME 10

100
10 ⋀ 10
SCORE FUNCTION

[FIG. 18]

| SCORE FUNCTION PARAMETER DISPLAY | | | | | | | | | |
|---|---|---|---|---|---|---|---|---|---|
| CONCEN-TRATION | START POINT (TIME) | | | APEX (TIME) | | | END POINT (TIME) | | |
| | MINIMUM | MAXIMUM FREQUENCY | MAXIMUM | MINIMUM | MAXIMUM FREQUENCY | MAXIMUM | MINIMUM | MAXIMUM FREQUENCY | MAXIMUM |
| 5 | 25 | 30 | 31 | 38 | 40 | 42 | 51 | 53 | 57 |
| 50 | 23 | 29 | 31 | 38 | 40 | 42 | 52 | 55 | 61 |
| 500 | 20 | 27 | 29 | 36 | 41 | 45 | 55 | 65 | 75 |

[FIG. 19A]

| PEAK DETECTION RESULT AND EVALUATION SCORE DISPLAY | | | | | | | | |
|---|---|---|---|---|---|---|---|---|
| SAMPLE ID | TIME | | | AREA | SCORE | | | |
| | START POINT | APEX | END POINT | | PEAK | START POINT | APEX | END POINT |
| A001 | 29 | 40 | 55 | 1436 | 100 | 100 | 100 | 100 |
| A002 | 26 | 40 | 59 | 1443 | 40 | 55 | 100 | 40 |
| A003 | 31 | 43 | 57 | 157 | 0 | 10 | 0 | 10 |

[FIG. 19B]

| DETAILED INFORMATION DISPLAY OF PEAK DETECTION SAMPLE ID A001 | | | | | | | | | |
|---|---|---|---|---|---|---|---|---|---|
| No. | TIME | | | TYPE | AREA | SCORE | | | |
| | START POINT | APEX | END POINT | | | PEAK | START POINT | APEX | END POINT |
| 1 | 29 | 40 | 47 | H | 1039 | 45 | 45 | 100 | 55 |
| 2 | 29 | 40 | 47 | V | 705 | 35 | 35 | 100 | 35 |
| 3 | 29 | 40 | 55 | V | 1436 | 100 | 100 | 100 | 100 |
| −1 | 47 | 50 | 54 | T | 120 | — | — | — | — |

[FIG. 20]
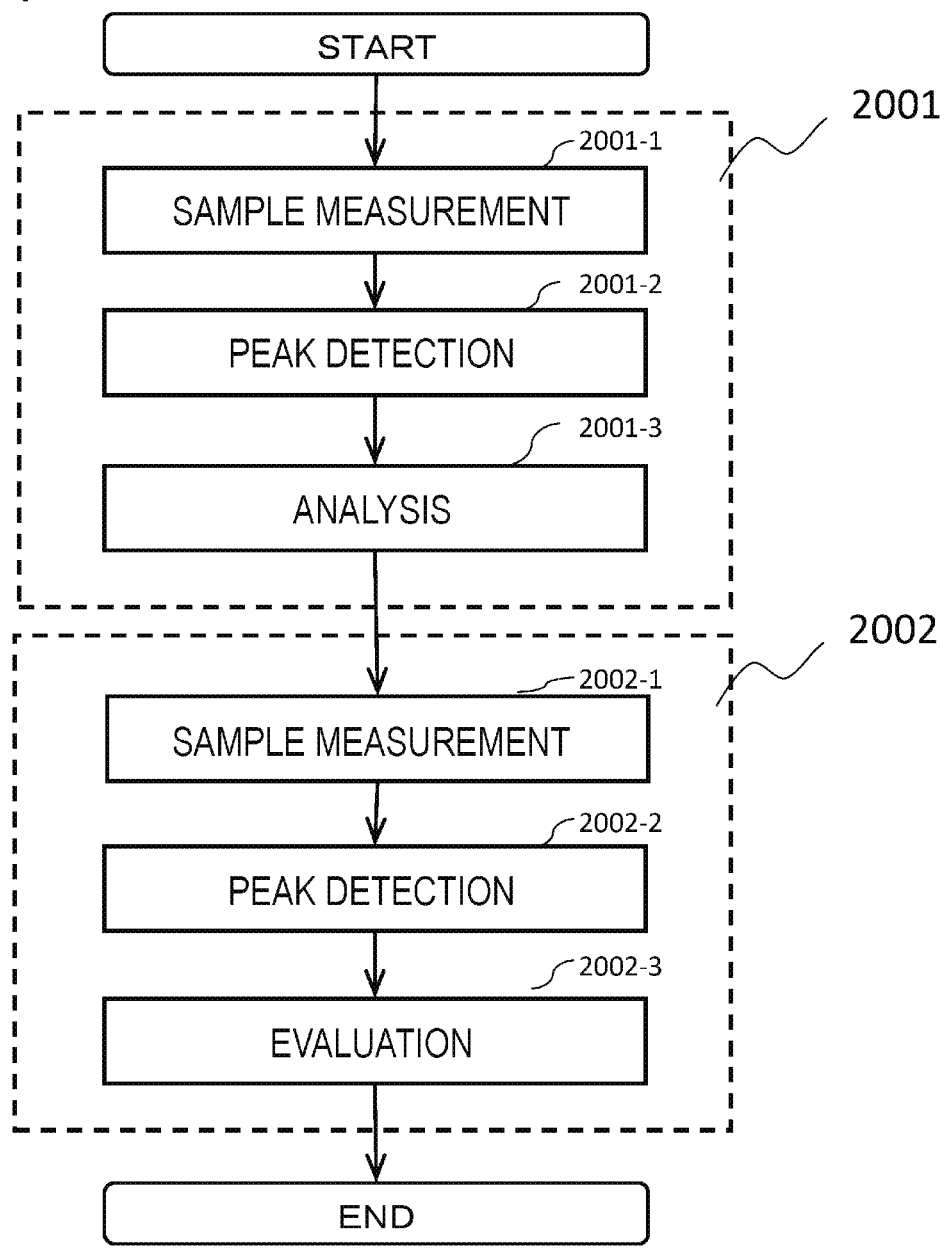

[FIG. 21A]
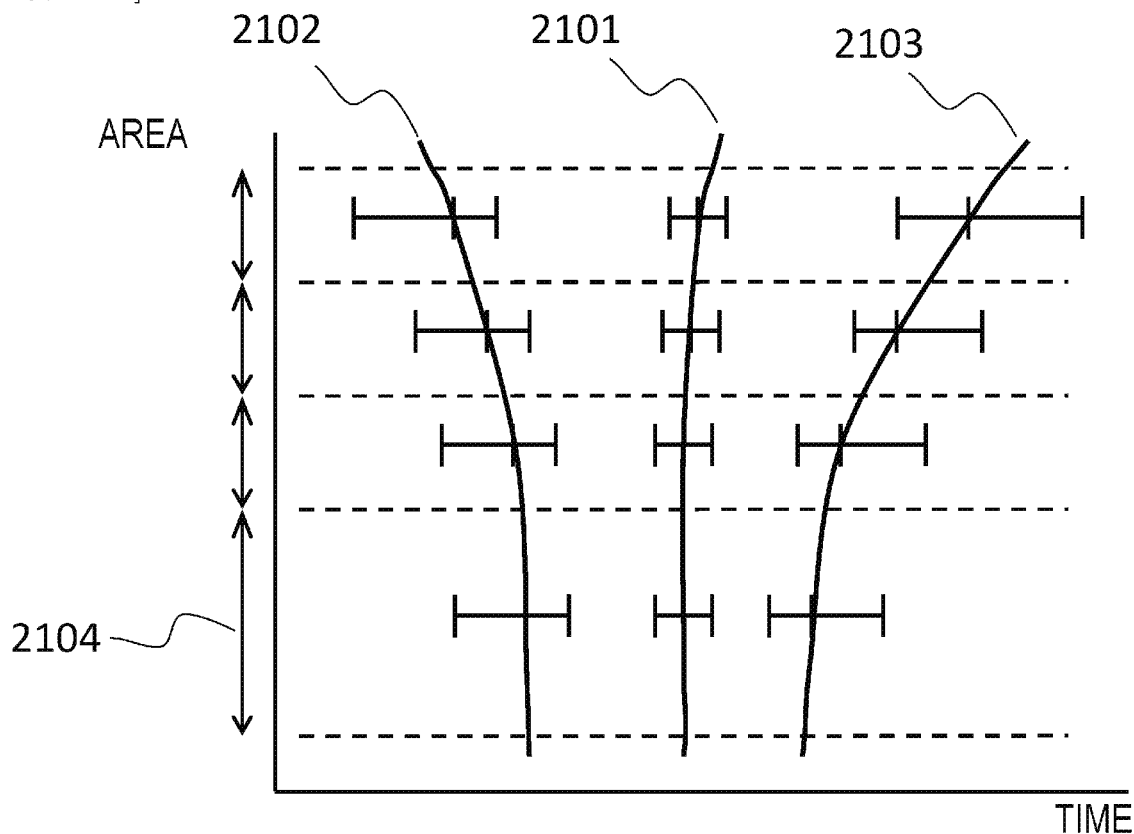
[FIG. 21B]
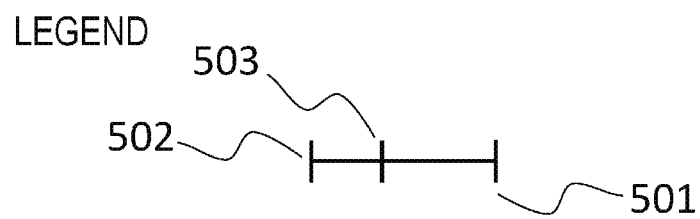
[FIG. 22]
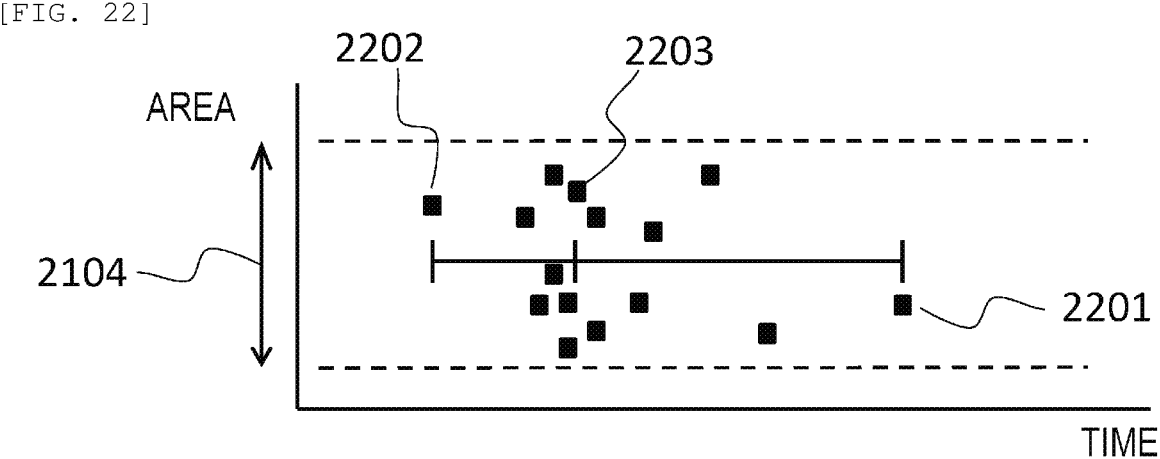

ved value and a concentration. By applying the calibration curve to a measured value of a component on which quantitative analysis is to be executed, the concentration can be calculated.
CHROMATOGRAPHY MASS SPECTROMETRY AND CHROMATOGRAPHY MASS SPECTROMETER

TECHNICAL FIELD

The present invention relates to a chromatography mass spectrometry and a chromatography mass spectrometer.

BACKGROUND ART

For quantitative analysis of a mixture such as a living body-derived sample, for example, a gas chromatograph (GC) or a liquid chromatograph (LC) that separates a target component is used. As the detector, a mass spectrometer may be adopted depending on sensitivity or selectivity to a target component.

Typically, a standard sample in which the concentration of a target component is already known is measured to generate a calibration curve representing a relationship between a measured value and a concentration. By applying the calibration curve to a measured value of a component on which quantitative analysis is to be executed, the concentration can be calculated.

The chromatograph is a device that temporally separates a mixture, and by connecting the chromatograph to a mass spectrometer, a graph representing a quantitative temporal change of a target component that is a chromatogram can be obtained. In general, the target component is detected as a peak on the chromatogram, and the area or height thereof is a measured value. For example, a contaminant that is detected as a peak of a component other than the target component or a noise component that is detected in the entire area is superimposed on the chromatogram. An operation of specifying a closed area derived from the target component in the chromatogram and acquiring the area or height thereof as a measured value is peak detection.

In NPL 1, in a range of a start point to an end point of a peak, a cumulative value of differences between signal values of the peak and signal values of a baseline is the area of the peak. NPL 1 describes that the height is obtained by subtracting a signal value of the baseline at the same time as that of an apex of the peak from a signal value of the apex of the peak. Further, a vertical method, a valley-to-valley method, or a tangent method is described as a method of dividing the areas of overlapping peaks. In addition, for example, a method of acquiring a symmetry coefficient representing the degree of symmetry between peaks is disclosed.

PTL 1 discloses a method of separating overlapping peaks based on a change amount of a signal intensity. PTL 2 discloses a method of separating a single peak from overlapping peaks by fitting to a Gaussian function or the like.

On the other hand, in the above-described gas chromatograph or liquid chromatograph, ideally, even when concentrations of a target component are different from each other, times of apexes of peaks are the same. Therefore, there are many cases where a ground based on which the components are determined to be the same is acquired from the times of the apexes. In addition, PTL 3 describes a method in which, even when the shape of a peak or the position of an apex changes due to influence of the concentration of a target component or the like, in a case where a start position of the peak is the same as that of a standard material, the components are determined to be the same based on the start position of the peak.

This way, the values of the time and the like from the peak detection of the chromatogram are also used to determine whether or not components are the same.

CITATION LIST

Patent Literature

PTL 1: JP-A-S61-145457
PTL 2: JP-A-S63-151851
PTL 3: JP-A-2012-163475

Non-Patent Literature

NPL 1: General rules for High Performance Liquid Chromatography (JIS K 0124: 2011, Mar. 22, 2011)

SUMMARY OF INVENTION

Technical Problem

In GC-MC (gas chromatography-mass spectrometer) or LC-MS (liquid chromatography-mass spectrometer), for analysis or the like of a living body-derived sample, a corresponding concentration range from high-sensitivity detection of a minor component to detection of a component having a relatively high concentration is enlarged.

Depending on analysis conditions of target samples, broadening where a peak detection range is broadened or leading or tailing where symmetry is lost occurs. When the amount of a target component is small, a peak shape may also be disturbed due to strong influence of a signal derived from a noise or a contaminant.

In the peak detection in the related art, a relatively fixed condition is applied to the shape and the like of a peak, and it is difficult to obtain a correct result under the above-described circumstances.

For example, in the fitting adopting a Gaussian function, ideally, it is assumed that a peak shape is a normal distribution.

However, in the case of tailing or a distorted shape that is not suitable for a Gaussian function, the result may deviate largely from the correct value.

In addition, in the peak detection, in general, the detection result is evaluated based on the symmetry between peaks, the rate of concordance with a model function such as a Gaussian function, or the like.

However, under the above-described circumstances, it is difficult to say that the index such as symmetry or rate of concordance is sufficient.

In the evaluation of the peak detection result, a method of focusing on the fact that a time of the start of a peak is similar to that of a standard material is developed. However, it is difficult to comprehensively evaluate the result in consideration of a variable factor such as times of apexes or end points of peaks having different shapes.

In order to evaluate the peak detection result, a technique in the related art focuses on a non-variable factor such as a time of an apex or, as described above, a time of a start point of a peak.

However, under a circumstance where a time of an apex or a time of a start point or an end point of a peak changes due to a difference in concentration, a sufficient evaluation method focusing on the values thereof is not yet present.

By evaluating the peak detection result, whether or not a target component or a contaminant is present and defects of an analyzer are detected, and it is required to take a countermeasure against the detection, for example, to execute measurement again. However, with the current evaluation method, it is difficult to take a sufficient countermeasure.

In addition, in quantitative analysis, the area or height of a peak itself is a measured value and directly affects conversion into a concentration. Under the above-described circumstances, it is difficult to appropriately detect the area or height of a peak to obtain an index for appropriately evaluating the reliability of the result and the like.

An object of the present invention is to provide a chromatography mass spectrometry and a chromatography mass spectrometer capable of peak detection that can deal with a wide concentration range of a sample component and providing an evaluated value for the result.

Solution to Problem

In order to achieve the objects, the invention is configured as follows.

A chromatography mass spectrometer that separates a target component of a sample for mass spectrometry, the chromatography mass spectrometer including a data processing unit that calculates a score function representing tendencies of a start point and an end point of a baseline and an apex of a peak with respect to a detection time at which a sample having a known component concentration is detected and a measured value of an area or a height of the component concentration, calculates a score value for a detection time at which a sample having an unknown component concentration is detected and a measured value of an area or a height of the component concentration using the calculated score function, and selects a peak of the sample having the unknown component concentration based on the calculated score value.

A chromatography mass spectrometry of separating a target component of a sample for mass spectrometry, the chromatography mass spectrometry including: calculating a score function representing tendencies of a start point and an end point of a baseline and an apex of a peak with respect to a detection time at which a sample having a known component concentration is detected and a measured value of an area or a height of the component concentration; calculating a score value for a detection time at which a sample having an unknown component concentration is detected and a measured value of an area or a height of the component concentration using the calculated score function; and selecting a peak of the sample having the unknown component concentration based on the calculated score value.

Advantageous Effects of Invention

According to the present invention, it is possible to implement a chromatography mass spectrometry and a chromatography mass spectrometer capable of peak detection that can deal with a wide concentration range of a sample component and providing an evaluated value for the result.

BRIEF DESCRIPTION OF DRAWINGS

FIG. 1 is an operation flowchart of Example 1.

FIG. 2 is a schematic configuration diagram illustrating an LC-MS to which Example 1 is applied.

FIG. 3 is a diagram illustrating an example in which a chromatogram is generated in a pseudo manner.

FIG. 4 is an enlarged view illustrating a portion indicated by a dotted line of the chromatogram illustrated in FIG. 3.

FIG. 5A is a schematic diagram illustrating results of executing the measurement illustrated in FIG. 3 multiple times.

FIG. 5B is an explanatory diagram of FIG. 5A.

FIG. 6 is a graph schematically illustrating a relationship between a time and a frequency as a histogram by using an endpoint of a baseline at a specific concentration.

FIG. 7A is a diagram illustrating an example of a model in which a frequency is reflected on a score.

FIG. 7B is a diagram illustrating a score function in which a time range where an end point of a baseline is likely to appear is represented by 1 and another time range is represented by 0.

FIG. 8A is a diagram illustrating a chromatogram in the vicinity of a baseline end point of a peak for deriving the score function.

FIG. 8B is a diagram illustrating calculation of a score of the chromatogram in the vicinity of the baseline end point.

FIG. 8C is a table illustrating an example of acquiring an appearance probability p of a valley at each point when a signal intensity of each point illustrated in FIG. 8B is represented by D and a maximum increment M is 5.

FIG. 9 is a diagram illustrating an example of a peak on a chromatogram obtained by measuring a sample having an unknown concentration, an apex of the peak, and a start point and an end point of a baseline.

FIG. 10 is a diagram illustrating application of the score function.

FIG. 11 is a diagram illustrating a method of acquiring a score value by interpolation.

FIG. 12 is a diagram illustrating a method of acquiring the score function.

FIG. 13 is a diagram illustrating a method of determining a score from the score function.

FIG. 14A is a diagram illustrating an example of detecting a plurality of peak candidates in Example 2.

FIG. 14B is a diagram illustrating another example of detecting a plurality of peak candidates in Example 2.

FIG. 14C is a diagram illustrating still another example of detecting a plurality of peak candidates in Example 2.

FIG. 15 is a functional block diagram illustrating processes of Example 2.

FIG. 16 is a diagram illustrating an example of a setting screen of a peak detection condition.

FIG. 17 is a diagram illustrating an example of a setting screen of a score function generation condition.

FIG. 18 is a diagram illustrating a score function parameter display example.

FIG. 19A is a diagram illustrating an example of a peak detection result and an evaluation score display.

FIG. 19B is a diagram illustrating an example of displaying detailed information regarding peak detection.

FIG. 20 is a diagram illustrating analysis of detection results in Example 3 and evaluation process flows of the detection results.

FIG. 21A is a schematic diagram illustrating results of analyzing tendencies of an apex of a peak and a start point and an end point of a baseline obtained in peak detection.

FIG. 21B is an explanatory diagram of FIG. 21A.

FIG. 22 is a diagram illustrating an analysis result of an end point in a specific area range.

DESCRIPTION OF EMBODIMENTS

Hereinafter, an embodiment of the present invention will be described with reference to the drawings. The embodiment of the present invention is not limited to examples described below.

EXAMPLES

Example 1

FIG. 1 is an operation flowchart of Example 1 of the present invention, and FIG. 2 is a schematic configuration diagram illustrating an LC-MS to which Example 1 is applied.

In FIG. 2, a liquid chromatograph 201 includes: a liquid delivery pump 201-1 that delivers an eluent 204; a sample introduction device 201-2 that introduces a sample 209; and a column (analysis column) 201-3.

In addition, a mass spectrometer 202 includes an ion source 202-1, a mass spectrometry unit 202-2, and a detector 202-3.

In addition, a data processing device (data processing unit) 203 includes a data collection program 203-1 and a data processing program 203-2. By executing the programs 203-1 and 203-2, the data processing device 203 calculates a score function described below, calculates a score value of a component having an unknown concentration in a sample using the calculated score function, and selects a peak of the component having the unknown concentration in the sample based on the calculated score value. The data processing device 203 is connected to a display device 207 and a keyboard 208.

Although not illustrated in FIG. 2, the data processing device 203 includes a functional block that executes each of operations illustrated in FIG. 1. That is, respective process steps illustrated in FIG. 1 correspond to the functional blocks of the data processing device 203. The data processing device 203 includes a measurement unit for components having different concentrations, a peak detection unit, a score function determination unit, a measurement unit for a component having an unknown concentration, and an evaluation unit for a peak detection result.

The liquid chromatograph 201 is controlled by an LC control device 205, and the mass spectrometer 202 is controlled by an MS control device 206. In addition, the LC control device 205, the MS control device 206, and the data processing device 203 are connected to each other.

The operation of Example 1 will be described.

In FIG. 1, the process flows of Example 1 can be roughly classified into a first half step 101 and a second half step 102 that are surrounded by dotted lines. The first half step 101 includes Steps 101-1 to 101-3 and obtains characteristics of peaks at different concentrations. The second half step 102 includes Steps 102-1 to 102-3 and analyzes a sample having an unknown concentration.

(1) Measurement of Components Having Different Concentrations (Step 101-1)

First, a plurality of samples having different concentrations of a target component are measured.

The liquid chromatograph (LC) 201 delivers the eluent 204 to the column 201-3 side using the liquid delivery pump 201-1. In the sample introduction device 201-2 provided halfway, the sample 209 to be measured causes to flow together with the flow of the eluent 204. In general, the column 201-3 has a cylindrical shape, and the component in the sample flowing together with the eluent 204 passes through the column 201-3. Here, the column 201-3 is not a single flow path and is filled with a material that is selected such that moving speeds of a target component and a contaminant are different from each other. That is, a mixture that is introduced into the column 201-3 by the sample introduction device 201-2 substantially at the same time is discharged from the column 201-3 with a time difference.

For example, the summary of measurement of analyzing a metabolite in blood will be described.

First, as a pre-treatment, a mixed solution of methanol and propanol is added to 100 µL of serum such that protein is insoluble. Further, 500 µL of hexane is added to extract a target component. After centrifugal separation, 400 µL of the target component is transferred from the hexane layer and dried. 300 µL of a mixed solution of water and methanol was added to the target component to prepare a sample for LC-MS.

The liquid delivery pump 201-1 delivers the eluent 204 obtained by mixing methanol and formic acid aqueous solution at 7:3 at a flow rate of 300 µL/min. Together with the flow of the eluent 204, 50 µL of the sample having undergone the pre-treatment is introduced from the sample introduction device 201-2 into the column 201-3 held at 20° C. The column 201-3 is obtained by filling, for example, a stainless steel tube having a length of 50 mm and an inner diameter of 2 mm with a hydrophobic material, for example, a spherical porous silica gel of a diameter 3 µm having a surface to which an octyl group (—C8H17) is bonded.

The previous ratio of the eluent 204 is maintained for 3 minutes from a timing where the sample is introduced, is changed to 9.5:0.5 for 1 minute, and subsequently is maintained for 1 minute. In a state where the ratio of the solvent is 7:3, apart of the contaminant is eluted from the column 201-3, but the target component is held in the column 201-3. In a state where the ratio of the eluent 204 is 9.5:0.5, the target component is also eluted from the column 201-3 and separated.

Methanol in the eluent 204 is a material having polarity. A phenomenon in which, when the concentration increases, a force with which the material filled in the column 201-3 holds the target component having polarity is weakened is applied.

In the above-described example, by reproducibly controlling the states of the eluent 204, the liquid delivery pump 201-1, the introduction of the sample 209, the column 201-3, and the like, the reproducibility of a time (elution time) for which the target component is held in the column 201-3 can be secured.

On the other hand, a change in the composition of the eluent 204, wear of the liquid delivery pump 201-1, liquid leakage from a pipe, a temperature change of the column 201-3, clogging of the column 201-3, desorption of a functional group such as an octyl group, presence of bubbles, or the like causes the elution time of the target component to be an abnormal value. Further, when the sample 209 to be measured includes a component that affects an interaction between the column 201-3 and the target component, the elution time changes.

The mass spectrometer (MS) 202 ionizes the sample component in the ion source 202-1, selects ions having a specific mass-to-charge ratio (m/z) in the mass spectrometry unit 202-2, and detects a signal of an ion content in the detector 202-3. That is, the mass spectrometer 202 can acquire a chromatogram representing a temporal change in the ion content having the specific mass-to-charge ratio (m/z) derived from the sample component.

Examples of a method of ionizing the component separated in the liquid chromatograph 201 using the mass spectrometer 202 include electrospray ionization (ESI) and atmospheric pressure chemical ionization (APCI). When the ESI is adopted, in the atmospheric pressure environment, a liquid sample is sprayed from a position having a potential difference of several KV to produce, for example, ions to which protons (H+) are added.

As the mass spectrometry unit 202-2, some types can be adopted. In quantitative analysis of a biological sample, for example, a type called a triple quadrupole is selected. The triple quadrupole has a function of causing only ions having a specific mass-to-charge ratio to pass in a vacuum in the first-stage quadrupole, cleaving the ions with collision energy with particles of inert gas in the second-stage quadrupole, and causing only ions having a specific mass-to-charge ratio among cleaved product ions to pass in the third-stage quadrupole.

When the separation in the liquid chromatograph 201 is not sufficient and the ionized contaminant has the same mass-to-charge ratio as that of the target component, the target component cannot be separated in the first-stage quadrupole, but product ions derived from the target component can be guided to the detector 202-3 in the third-stage quadrupole.

The ions that reach the detector 202-3 are converted into an electric signal and amplified by a photomultiplier tube (PMT) or the like, the electric signal is measured as the ion content.

In the data processing device 203, the data collection program 203-1 executes a basic control of the LC 201 or the MS 202 and collects the signal of the ion content output from the detector 202-3. Further, the data processing program 203-2 generates a chromatogram representing a temporal change in ion content or executes a process such as peak detection. The process condition of the data processing program. 203-2 can be set by a user using the display device 207 or the keyboard 208, and the result thereof can also be checked by the display device 207.

In order to obtain a chromatogram of the target component, ions on the MS 202 side are detected at the timing at which the sample is introduced by the LC 201. Accordingly, the data collection program 203-1 needs to be synchronized with the LC control device 205 or the MS control device 206.

In the general triple quadrupole mass spectrometer 202, for example, ions derived from a plurality of target components are sequentially detected by switching a mass-to-charge ratio to be measured, for example, per 100 ms. Even in this case, the data processing program 203-2 can extract a signal of the ion content for each of the target components to generate a chromatogram.

Further, by setting, for example, the time at which the target component is eluted in advance, the corresponding peak is detected, and analysis such as generation of a calibration curve or quantitative analysis is executed.

After Step 101-1, Step 101-2 is executed.

(2) Peak Detection (Step 101-2)

FIGS. 3 and 4 are diagrams illustrating general peak detection. FIG. 3 is a diagram illustrating an example in which a chromatogram is generated in a pseudo manner. FIG. 4 is an enlarged view illustrating a portion indicated by a dotted line of the chromatogram illustrated in FIG. 3. In FIG. 3, the horizontal axis represents the time, and the vertical axis represents the ion content. In the example illustrated in FIG. 3, chromatograms corresponding to three times of measurement including a chromatogram 301 of a 1-time concentration, a chromatogram 302 of a 10-time concentration, and a chromatogram 303 of a 100-time concentration are generated and are overwritten in a state where noise waveforms that are the same are superimposed.

In FIG. 4, a valley (minimum point) that appears first when seen from an apex of the chromatogram 301 of a 1-time concentration is set as a start point or an end point and is marked with a black circle together with the apex.

Based on the time at which the sample 209 is introduced into the LC 201, a point at which the target component starts to be detected is a start point, a point at which the detection ends is an end point, and a point at which a maximum amount of the target component is detected between the start point and the end point is an apex.

In the chromatogram 301, a straight line connecting the start point and the endpoint is called a baseline, and a portion above the baseline is the area of the peak. The height refers to the length of a perpendicular line from the apex to the straight line connecting the start point and the end point (corresponding to the length of a dotted line from the apex illustrated in FIG. 4). The area or height is a measured value of the corresponding component.

The baseline may be a line in which a signal obtained by detecting the eluent 204 is recorded without a peak derived from a component in the sample but, here, is defined as described above.

In FIG. 4, in the chromatogram 302 of a 10-times concentration and the chromatogram 303 of a 100-times concentration, the start point and the end point are marked with a circle, but the apex is not illustrated.

This way, in the chromatogram, a process of confirming the apex of the peak and the start point and the end point of the baseline and acquiring the area or the height is the peak detection. In addition, as illustrated FIG. 3 or 4, when the area or the height of the peak increases, the position of the start point or the endpoint of the baseline may be transferred to the outside of the apex.

After Step 101-2, Step 101-3 is executed.

(3) Determination of Score Function (Step 101-3)

FIG. 5A is a schematic diagram illustrating results of executing the measurement illustrated in FIG. 3 multiple times. FIG. 5B is an explanatory diagram of FIG. 5A. In FIG. 5A, the horizontal axis represents the detection time of the apex of the peak or the start point or the end point of the baseline in the chromatogram. In FIG. 5A, the vertical axis represents the average peak areas corresponding to the 1-time component concentration, the 10-times component concentration, and the 100-times component concentration on a log scale. As illustrated as a legend in FIG. 5B, a horizontal line intersecting the start point, the apex, and the end point illustrated in FIG. 5A represents a time range in which each point is detected, and each of a maximum time 501, a minimum time 502, and a maximum frequency time 503 is marked with a vertical bar.

FIG. 5A illustrates a state where the start point or the end point becomes distant from the apex as the concentration increases. This shows a tendency of the start point or the endpoint in FIGS. 3 and 4. In addition, the maximum frequency time 503 of the start point is close to the maximum time 501, and the maximum frequency time 503 of the end point is close to the minimum time 502.

FIG. 6 is a graph schematically illustrating a relationship between a time and a frequency as a histogram by using an end point of a baseline at a specific component concentration. The time in the horizontal axis of FIG. 6 is divided, for example, per minute, and a time frame in which the end point is detected and the number of times thereof are represented by a bar graph. In FIG. 6, based on the time 503 at which the maximum frequency is shown, the frequency tends to decrease relatively rapidly on the front side ((the side where the time value is small (the minimum time 502 side)), and the frequency tends to decrease relatively gently on the rear side ((the side where the time value is large (the maximum time 501 side)).

In the present invention, focusing on this tendency, an evaluated value such as probability is provided as a score for an apex of a peak and a start point and an endpoint of a baseline.

Hereinafter, a score function will be described using an end point of a baseline as an example.

FIGS. 7A and 7B are diagrams illustrating examples of the score function.

FIG. 7A is a diagram illustrating an example of a model in which a frequency is reflected on a score. It is assumed that, based on information of the frequency in FIG. 6, the score value of the maximum frequency time 503 is 100 and the score values of the maximum time 501 and the minimum time 502 in FIG. 6 are 10. The time illustrated in FIG. 7A is the time that is actually measured. Therefore, times in a range where the end point is actually detected are newly set as a maximum time 701 and a minimum time 702 at which the end point is likely to be detected, and the score values are set as 0. Using these times and the score values, a score with respect to a given time is approximated to a line and is defined as a score function.

That is, the score function is a function based on frequency information obtained from peak detection results derived from samples having different concentrations.

The respective times that determine the score function can be set, for example, as follows: times regarding original data of a histogram are sorted in ascending order, a time as a median value is set as the maximum frequency time 503, a time corresponding to a ⅕ value among all the times is set as the minimum time 502, a time corresponding to a ⅘ value among all the times is set as the maximum time 501, a time obtained by subtracting a difference between the first time and the minimum time 502 from the first time is set as the minimum time 702 at which the end point is likely to be detected, and a time obtained by adding a difference between a time as final data and the maximum time 501 to the time as the final data is set as the maximum time 701 at which the end point is likely to be detected.

In addition, an apex of a peak only has to have a temporal characteristic of the peak, and can be replaced with, for example, a time corresponding to the center of gravity in a range where the area is obtained.

FIG. 7B is a diagram illustrating a score function in which a time range where an end point of a baseline is likely to appear is represented by 1 and another time range is represented by 0. For example, a time corresponding to an apex of a peak is relatively frequently reproduced in a given range. In order to simply determine two values of whether or not the apex of the peak is derived from a target component, the determination of 1 or 0, that is, relevant or irrelevant is also meaningful.

Another method of deriving the score function will be described with reference to FIGS. 8A, 8B, and 8C by using an end point of a baseline as an example. In the other method, the score function is a function that is determined based on an appearance probability of a valley obtained from a peak and a noise region on a chromatogram between the start point and the end point of the baseline.

In the vicinity of the end point, the amount of the target component gradually decreases. In order for the end point of the baseline, that is, the valley (minimum point) to appear, it is necessary that the amount of an increase of a signal derived from a noise is more than that the amount of a decrease of a signal derived from the target component. Focusing this point, the appearance probability of the end point is reflected as a score.

FIG. 8A is a diagram illustrating a chromatogram 801 in the vicinity of a baseline end point of a peak for deriving the score function. Here, a noise region 803 is set after the detected baseline end point 802. If an appropriate noise region is not present, a sample in which the target component is not present is measured, and a time at which the target component is likely to be eluted in the chromatogram can also be set as the noise region.

In the noise region 803, a valley and a peak are alternately repeated. In the region 803, an average interval t between the valleys, a maximum increment M from the valley to the peak, and an average value 804 of signals are obtained. Here, a model in which an average interval between valleys is t and increments from valleys to peaks appear equally in a range of 0 to the maximum increment M is set with respect to a noise waveform.

A chromatogram 811 in which the influence of a noise is excluded from the chromatogram 801 by smoothing or regression analysis as illustrated in FIG. 8B is generated. Here, the accuracy of a regression curve can be improved by adding, for example, a condition where the amount of the target component gradually decreases toward the average value 804 in the noise region 803 in the vicinity of the end point 802

In the chromatogram 811, a position 812 corresponding to the maximum increment M from the valley to the peak is detected in the average interval t between valleys in the noise region. Here, the apex side from the position 812 is a region where the change amount is more than that of the maximum increment M. In this region, the end point of the baseline is not likely to appear.

On the other hand, the side opposite to the apex (the right side in the drawing) is a region where the change amount in the chromatogram 811 gradually decreases. Since the width of decrease is less than the maximum increment M, the endpoint of the baseline appears in this region.

FIG. 8B is a diagram illustrating calculation of a score of the chromatogram in the vicinity of the baseline endpoint. From the point of the position 812, points are set at the time intervals t and are assigned with Nos. 1 to 7. The position 812 of No. 1 is the starting point of the region where the end point of the baseline is likely to appear.

Next, a method of acquiring a probability that each of the points assigned with the numbers is a valley will be described.

Even if the noise of the maximum increment M overlaps a peak immediately after the point 812 of No. 1, the point of No. 1 is not a valley. However, a difference between the point of No. 2 and the point of No. 3 is less than the maximum increment M. Therefore, when the noise of the maximum increment M overlaps the next peak, the point of No. 2 is a valley. Assuming that increments from valleys to peaks appear equally in a range of 0 to the maximum increment M, an appearance probability of a valley can be expressed by $((M-\Delta D)/M)$. Here, $\Delta D$ represents a difference (absolute value) from the next point.

FIG. 8C is a table illustrating an example of acquiring an appearance probability p of a valley at each point when a signal intensity of each of the points of Nos. 1 to 7 illustrated in FIG. 8B is represented by D and the maximum increment M is 5. For example, a probability p in which the point of No. 2 is a valley is (5−2)/5=0.6, and a probability p in which the point of No. 3 is a valley is (5−1)/5=0.8.

Assuming that the first valley from the apex is the end point of the baseline, in order for a given point to be an end point, a condition that a point on the apex side from the given point is not a valley needs to be satisfied. Assuming that the probability that the point is not a valley is (1−p), a probability that the point of No. 2 is an end point is the product of a probability that the point of No. 1 is not a valley and a probability that the point of No. 2 is a valley, that is, (1−0)×0.6=0.6. A probability that the point of No. 3 is an end point is the product of a probability that the point of No. 1 is not a valley, a probability that the point of No. 2 is not a valley, and a probability that the point of No. 3 is a valley, that is, (1−0)×(1−0.6)×0.8=0.32. A probability that the point of No. 4 is an end point is the product of a probability that the point of No. 1 is not a valley, a probability that the point of No. 2 is not a valley, a probability that the point of No. 3 is not a valley, and a probability that the point of No. 4 is a valley, that is, (1−0)×(1−0.6)×(1−0.8)×0.8=0.064. This value is illustrated in FIG. 8C as S (score). The value corresponds to a relationship (score function) of the score with the time illustrated in FIG. 8B.

Hereinabove, the frequency model, the relevant/irrelevant model, and the model of deriving the score function based on the chromatogram and the noise region have been described. Various other models can be set based on a tendency of an apex of a peak or a start point or an end point of a baseline.

An appearance position of a peak on a chromatogram may change depending on the temperature of the column 201-3, the composition of the eluent 204, and the like. When a phenomenon in which the elution time varies over the entire region of a peak and a phenomenon in which the position of a start point or an end point of a baseline changes with respect to an apex are taken into consideration separately, a difference from the apex can also be focused for the evaluation of the time of the start point or the end point of the baseline. That is, the horizontal axis of the score function of the start point or the end point may represent a difference between the apex and the time.

Hereinabove, the method of modeling, as the score function, temporal tendencies of apexes of peaks (having different areas) and start points and end points of baselines obtained from measurement of samples having different concentrations of the same target component has been described. Even when the concentration is unknown as long as samples are the same, this method can be applied.

In addition, in the case of a standard sample for generating a calibration curve, the amount of a contaminant is small, the peak detection is relatively easy, and the reliability or reproducibility of the result is also high. That is, a tendency of an apex of a peak or a start point or an end point of a baseline with respect to the area can be easily acquired.

After Step 101-3, Step 102-1 is executed.

(4) Measurement of Component Having Unknown Concentration (Step 102-1)

In measurement of the component having an unknown concentration, basically, analysis is performed using the devices described in "(1) Measurement of Components having Different Concentrations (Step 101-1)" under the same conditions.

Next, Step 102-2 is executed.

(5) Peak Detection (Step 102-2)

Basically, the peak detection with respect to the measurement result of the component having an unknown concentration is also executed using the same method as that of "(2) Peak Detection (Step 101-2)". FIG. 9 is a diagram illustrating an example of a peak on a chromatogram obtained by measuring a sample having an unknown concentration, an apex of the peak, and a start point and an end point of a baseline. The area of an upper closed area of the baseline connecting the start point and the endpoint obtained herein is calculated, and a measured value of the peak is obtained.

Next, Step 102-3 is executed.

(6) Evaluation of Peak Detection Result (Step 102-3)

A method of acquiring a score value with respect to a measured value (area) in FIG. 9 will be described FIGS. 10 and 11. Here, for convenience of description, the description will be made using an end point. However, the idea can be applied to a start point or an apex.

FIG. 10 is a diagram illustrating application of the score function. In FIG. 10, two score functions corresponding to areas closed to the measured value are selected. Here, it is assumed that the areas are A1 and A2. FIG. 11 is a diagram illustrating a method of acquiring a score value by interpolation by applying each of the score functions to a time of an end point, and scores S1 and S2 can be obtained as illustrated in FIG. 11.

Here, as illustrated in FIG. 11, the score of the end point is obtained from the measured value by interpolation. When two score functions suitable for interpolation are not present, two score functions closest to each other are selected and extrapolated.

Another method of acquiring a score will be described using FIGS. 12 and 13.

In the method illustrated in FIGS. 10 and 11, the score is obtained by interpolation. However, an example of acquiring a score function itself from a characteristic point by interpolation is shown. When a score function to be interposed is not present and interpolation is difficult, extrapolation may be adopted.

In FIG. 12, as in FIG. 10, a score function 1 and a score function 2 corresponding measured values close to the measured value (area) are selected. Here, the characteristic point such as the maximum time, the minimum time, or the maximum frequency time of the score function will be focused. For example, in the example of FIG. 12, in the score functions 1 and 2, maximum times are connected using a line segment 1201, and the maximum value of the measured value is interpolated. Likewise, minimum times and maximum frequency times are connected using a line segment 1202 and a line segment 1203, respectively. As illustrated in FIG. 13, a score is determined from the obtained score function.

Here, a time for determining the score function is interpolated. When scores of characteristic points in the score functions 1 and 2 are different from each other, a score function corresponding to the measured value can be acquired by interpolating the score value.

Here, a relatively simple score function has been described, but the score function or the like illustrated in FIGS. 7A and 7B or 8A to 8C can be applied.

Using the same method as that of the maximum time, scores of an apex of a peak and a start point of a baseline are obtained. Further, the sum or product of the obtained scores, the minimum value, or the like is set as the score of the peak. Here, when score functions are respective appearance probabilities, an index representing the probability of a peak including a start point, an apex, and an end point determined by acquiring the product of the score functions is obtained.

In addition, the appearance score functions are assigned with values of, for example, 0 to 100, the sum of a start point, an apex, and an end point may be acquired. Further, an index representing reliability may be represented by a minimum value among scores.

When a score is a relevant/irrelevant model, that is, is present or not, in a case where even one of an apex of a peak and a start point and an end point of a baseline is irreverent, the peak detection result is disposed based on the irrelevance.

For example, when the determination on whether or not the detected peak is a target component is important, a score of the apex can also be adopted to obtain the reliability of a quantitative value from the start point or the end point.

As described above, with Example 1 of the present invention, it is possible to implement a chromatography mass spectrometry and a chromatography mass spectrometer capable of peak detection that can deal with a wide concentration range of a sample component and providing an evaluated value for the result.

Example 2

Next, Example 2 of the present invention will be described.

In Example 2, the configurations of the liquid chromatograph 201, the mass spectrometer 202, the data processing device 203, the LC control device 205, the MS control device 206, the display device 207, and the keyboard 208 are the same as those of Example 1.

Example 2 provides a method and an apparatus capable of obtaining a more suitable peak detection result by applying evaluation using a score of the peak detection result. That is, Embodiment 2 provides a method and an apparatus capable of removing a contaminant from the obtained component waveform and selecting a more accurate peak detection result.

FIGS. 14A, 14B, and 14C are diagrams illustrating examples of detecting a plurality of peak candidates.

Waveforms illustrated in FIGS. 14A, 14B, and 14C are the same. In the example illustrated in FIG. 14A, a perpendicular line is drawn from a valley on the right of the apex, and a line from the left valley to an intersection with a straight line of a contaminant extending to the right valley is set as a baseline to determine a start point and an end point.

In the example illustrated in FIG. 14B, valleys on opposite sides of the apex are set as a start point and an end point.

In the example illustrated in FIG. 14C, as in the example illustrated in FIG. 14A, a straight line from a valley on the left of the apex to a right valley of the contaminant is set as a baseline to determine a start point and an end point. Further, in the example illustrated in FIG. 14C, a tangent line is drawn to the peak of the contaminant to determine a start point and an endpoint of a baseline of the contaminant. Here, the area above the straight line connecting the start point and the end point is adopted. However, in the example illustrated in FIG. 14C, the area of the contaminant is subtracted.

The values of the areas in the examples illustrated in FIGS. 14A, 14B, and 14C are different from each other and satisfy the area of the example illustrated in FIG. 14B<the area of the example illustrated in FIG. 14A<the area of the example illustrated in FIG. 14C. That is, in the evaluation of the start point, the apex, and the end point, a score can be obtained each of the area values. Here, by adopting a combination of highest scores as a peak, a peak including a start point, an apex, and an end point that are more suitable and the area thereof can be determined. This point will be described below in detail using a display example.

An algorithm of the related art may be applied to the selection of a plurality of candidates. For example, a method of comprehensively extracting valleys or tangent lines appearing before and after an apex and selecting a candidate that provides a closed surface with a baseline is considered.

FIG. 15 is a functional block diagram illustrating processes of Example 2.

Example 2 includes: a score function generation block 1501 that generates a score function and; a score function application block 1502 that applies the generated score function.

The score function generation block 1501 that generates a score function includes: a chromatogram measurement unit 1501-1 that measures and accumulates chromatograms having different concentrations; a detection condition setting unit 1501-3 that sets a peak detection condition; a peak detection unit 1501-2 that detects a peak of a chromatogram based on the designated condition; and an area-start point-apex-end point accumulation unit 1501-4 that accumulates an apex of a peak and a start point and an end point of a baseline with respect to the area obtained in the peak detection. Further, the score function generation block 1501 includes: a generation condition setting unit 1501-6 that sets a score function generation condition; a score function generation unit 1501-5 that generates a score function from the peak detection result; and a score function accumulation unit 1501-7 that accumulates a score function corresponding to the generated area.

The score function application block 1502 includes: a chromatogram measurement unit 1502-1 for an unknown concentration; a peak detection unit 1502-2; an area-start point-apex-end point accumulation unit 1502-3 that accumulates a peak detection result; a score calculation unit 1502-4; a start point-apex-end point score calculation unit 1502-5; a peak evaluation unit 1502-6; and a peak confirmation result accumulation unit 1502-7.

The function application block 1502 calculates a score from an apex of a peak or a start point or an end point of a baseline with respect to an area obtained in peak detection of a chromatogram having an unknown concentration, and acquires a score of the peak to evaluate the peak. Here, when a plurality of peak candidates are present, a candidate having the highest score is selected and configured as a peak. In the peak detection of the function application block 1502, the same condition as that of the function generation block 1501 is applied.

The process of the function generation block 1501 corresponds to the process of the first half step 101 in FIG. 1. The process of the function application block 1502 corresponds to the second half step 102 in FIG. 1. A large difference between the processes of the example illustrated in FIG. 1 and the processes of the blocks 1501 and 1502 illustrated in FIG. 15 is that a plurality of peak candidates may be output as illustrated in FIGS. 14A to 14C in the peak detection of the function application block 1502. Further, after acquiring a score of each of the candidates, a candidate having the highest probability can be extracted as a peak corresponding to a target component.

FIG. 16 is a diagram illustrating an example of a setting screen of a peak detection condition. This setting screen is a display screen in the display device 207.

In the example illustrated in FIG. 16, a setting example in a state where a target component is already selected is shown. In this example, when a specific peak is extracted from a chromatogram, a time range where an apex of the peak is detected and an ion content corresponding to a noise width for distinguishing between a noise and a signal are input. In general data processing, a condition for smoothing in the peak detection may be set in many cases. However, here, the condition is omitted. In the example illustrated in FIG. 16, the time range (min) is 3.5 to 4.5 minutes, and the noise width is 150.

FIG. 17 is a diagram illustrating an example of a setting screen of a score function generation condition. This setting screen is also a display screen in the display device 207.

The example illustrated in FIG. 17 is a setting example of a condition for generating a score function of an endpoint of a baseline.

In addition, in FIG. 17, any one of the score, the probability, the relevance/irrelevance can be selected as the type of the score function. However in the example illustrated in the drawing, the score is selected. Further, as the condition, scores of the maximum frequency time, the minimum time, and the maximum time are set as 100, 10, and 10, respectively.

When the probability is selected as the type in the setting screen illustrated in FIG. 17, a score of the corresponding time with respect to the area of the score function is output (displayed) as the probability. When the relevance/irrelevance is selected, for example, the process of assigning 1 (relevance) to the range between the minimum time and the maximum time and fixing another range to 0 (irrelevance) can be executed.

The setting screen illustrated in FIG. 17 does not include time parameters. However, the maximum time, the minimum time, and the maximum frequency time obtained in the measurement of the components having different concentrations are respectively applied.

FIG. 18 is a diagram illustrating a score function parameter display example. In FIG. 18, the minimum time, the maximum frequency time, and the maximum time of an apex of a peak and a start point and an end point of a baseline at each of concentrations (5, 50, 500) are arranged.

When the score of FIG. 17 is applied, for example, regarding the end point at the concentration of 5, the score of a minimum time 51 is 10, the score of a maximum frequency time 53 is 100, and the score of a maximum time 57 is 10. The respective times illustrated in FIG. 18 correspond to the values of the minimum time 502, the maximum frequency time 503, and the maximum time 501 at the times of the start point, the apex, the end point at each of the concentrations of FIGS. 5A and 5B.

FIG. 19A is a diagram illustrating a screen display example of a peak detection result and an evaluation score display. Focusing on a specific target component, FIG. 19A displays times of an apex of a peak, a start point and an end point of a baseline per sample, the area of the peak, the score of the peak, and the scores of the start point, the apex, and the end point. If a peak of a contaminant is excluded as in the example of FIG. 14C, a score function with respect to the area of the remaining portion after excluding the peak of the contaminant is applied to a start point, an apex, and an end point.

Here, a peak detection result and an evaluation score display of a sample having a sample ID of A001 in FIG. 19A match with the maximum frequency time at the start point, the apex, and the end point of the concentration of 50 illustrated in FIG. 18.

Therefore, when the scores (10, 100, 10) of FIG. 17 are applied, the scores of the start point, the apex, and the end point are 100, 100, and 100 respectively. As the score of the peak, the minimum value among the scores of the start point, the apex, and the end point is adopted.

In a sample having a sample ID of A002, the start point and the end point are positioned outside of the peak as compared to those of A001. In addition, in a sample having a sample ID of A003 to which the time of the apex of 43 is assigned, measured values close to the concentration of 5 of FIG. 18 are shown. However, the values are positioned outside of 38, 40, and 42 as the range of the minimum time, the most frequency time, and the maximum time of the score function of the apex, and thus the scores are 0.

As the results of the sample having the sample ID of A001 in FIG. 19A, suitable results are selected from a plurality of peak detection results based on the values obtained from the score function, and the detail thereof will be described using FIG. 19B. FIG. 19B is a diagram illustrating a screen display example of displaying detailed information regarding peak detection. Here, in FIG. 19B, No. represents a number assigned to a peak candidate, and a negative value represents that the value is subtracted as a contaminant. The time, the area, and the score have the same meanings as those of FIG. 19A. The type represents a method of drawing a baseline. Here, the type H represents the method of drawing a perpendicular line from a valley to determine an end point and connecting a line as in FIG. 14A, the type V represents the method of setting a valley as an end point and connecting a line as in FIG. 14B, and the type T represents the method of connecting a line using a tangent line as in FIG. 14C.

For example, a candidate of No. 3 illustrated in FIG. 19B is excluded as a peak of a contaminant represented by a negative value (−1). This way, when a plurality of candidates are detected in the peak detection, the scores of a start point, an apex, and an end point and the score of a peak with respect to the area are obtained for each of the candidates. Here, a candidate of No. 3 having the highest score is the peak detection result.

Here, the example arranging the results using the table is shown. For example, a method of directly displaying a score value on a peak on a chromatogram is also effective.

As described above, with Example 2 of the present invention, the same effects as those of Example 1 can be obtained. However, as compared to Example 1, a contaminant can be removed. Therefore, a more suitable peak detection result can be obtained.

In the above-described examples, the present invention is applied to the peak detection for overlapping peaks. The idea of selecting a suitable candidate from a plurality of candidates can be applied to a case where there are a plurality of candidates of a start point or an end point of a baseline in single peak detection. For example, when the first valley, the second valley, and the third valley positioned on the left of the apex are obtained as start point candidates and endpoint candidates are obtained using the same method, the number of methods of drawing baselines connecting the candidates is nine for three start point candidates and three end points. When all the candidates provide closed regions and are valid as peaks, a suitable candidate can be selected by evaluating the nine score values.

Hereinabove, the example of acquiring a score function from the measurement of the components having different concentrations and applying the score function to the peak detection has been described.

Example 3

Next, measurement of a sample having an unknown concentration will be described as Example 3 with reference to FIGS. 20, 21A, 21B, and 22. In Example 3, peak detection of a known sample component is executed to acquire a tendency thereof. Based on the acquired tendency, a measurement result of a sample having an unknown component is evaluated and a peak of the sample component having the unknown component is selected.

In Example 3, the configurations of the liquid chromatograph 201, the mass spectrometer 202, the data processing device 203, the LC control device 205, the MS control device 206, the display device 207, and the keyboard 208 are the same as those of Example 1.

FIG. 20 is a diagram illustrating analysis of detection results in Example 3 and evaluation process flows of the detection results. In the process flows illustrated in FIG. 20, a tendency of a peak detection result is analyzed from the measurement of a plurality of samples in the first-half portion (Step 2001) surrounded by a dotted line, and the peak detection results of the measurement of one or a plurality of samples are evaluated with respect to the acquired tendency in the second-half portion (Step 2002).

Hereinafter, the description will be made according to the flows of FIG. 20.

(1) Sample Measurement (Step 2001-1)

First, a plurality of samples including a target component are measured. As the apparatus to be used, the liquid chromatography mass spectrometer illustrated in FIG. 2 can be adopted. Here, the concentrations of the target component in the samples to be measured may be unknown. However, the number of samples for analysis described below needs to be sufficient.

(2) Peak Detection (Step 2001-2)

As illustrated in FIG. 3 or 4, an apex of a peak or a start point or an end point of a baseline is obtained as peak detection. In consideration of steps of analysis or evaluation described below, it is desirable to appropriately execute the detection using the data processing device 203 and to check the graph display or the like using the display device 207.

(3) Analysis (Step 2001-3)

In an analysis step 2001-3, assuming a sample having an unknown concentration, information corresponding to the maximum time 501, the minimum time 502, and the maximum frequency time 503 illustrated in FIG. 5A are acquired. An example of a method of acquiring the information will be described below using FIGS. 21A, 21B, and 22.

FIGS. 21A and 21B are schematic diagrams illustrating results of analyzing tendencies of an apex of a peak and a start point and an end point of a baseline obtained in peak detection. In FIG. 21A, the horizontal axis represents the detection time of the apex of the peak or the start point or the end point of the baseline in the chromatogram. In FIG. 21A, the vertical axis represents the area of the peak. As illustrated as a legend in FIG. 21B, a horizontal line represents a time range in which each point is detected. Basically, the horizontal lines correspond to the maximum time 501, the minimum time 502, and the maximum frequency time 503 illustrated in FIG. 5B.

In Example 1, the values are acquired from peaks of the target component derived from samples having the same concentration. In Example 3, however, as illustrated in FIG. 22, a section 2104 in the area is assumed, the maximum time, the minimum time, and the maximum frequency time are acquired from the area of the range and the time of each point. As the maximum frequency time, a median value when the respective time values are arranged in ascending order may be adopted.

FIG. 22 is a diagram illustrating an analysis result of an end point in a specific area range. In FIG. 22, focusing on the end point, the result including the time of the end point and the area obtained in the peak detection is marked with a square. Here, a maximum point 2201 and a minimum point 2202 in the time axis direction correspond to the maximum time 501 and the minimum time 502 in the time range. Here, the time of a point 2203 as a median value is adopted as a point corresponding to the maximum frequency time 503.

In this way, the maximum time, the minimum time, and the maximum frequency time in the area section 2104 are obtained and are associated with, for example, the average values of the areas thereof. Focusing on the end point, by setting a plurality of area sections and connecting a plurality of points obtained from the area and the maximum frequency time, a line 2103 representing the tendency of the end point illustrated in FIG. 21A can be acquired. Likewise, a line 2101 representing the tendency of the apex and a line 2102 representing the tendency of the start point can be obtained.

As the method of acquiring the lines 2101, 2102, and 2103 representing the tendencies of the apex, the start point, and the end point, methods other than the above-described method can be considered. For example, a method of extracting the areas and the times obtained in the peak detection to generate a scatter diagram and acquiring the tendencies by regression analysis or a method of generating a contour diagram from the densities of the respective points in the scatter diagram can be used.

(4) Sample Measurement (Step 2002-1)

The sample measurement in the second-half step 2002 of FIG. 20 is executed under the same condition as that of the sample measurement in the first-half step 2001. The measurement can also be executed under other conditions but is desirably executed under the same condition as that of the sample measurement in the first-half step 2001.

(5) Peak Detection (Step 2002-2)

Basically, the peak detection is executed using the same method as that of the peak detection of Step 2001-2.

(6) Evaluation (Step 2002-3)

As a method of evaluating the peak detection result in Example 3, the method of Step 102-3 in Example 1 can be adopted.

In addition, a score function of giving a penalty as the distance increases from the lines 2101, 2102, and 2103 representing the tendencies of the apex, the start point, and the end point obtained in the analysis step 2001-3 of (3) can also be adopted.

Hereinabove, Example 3 assuming the sample having an unknown concentration has been described. However, in Example 3, the same effects as those of Example 1 can be obtained. In addition, the peak detection method of selecting a candidate the highest score value from a plurality of candidates as described in Example 2 may also be applied to Example 3.

With the present invention, the following effects can be obtained.

(A) Provision of Evidence for Reliability of Quantitative Value

When an evaluated value such as reliability by the present invention is provided for an area or a height obtained in peak detection, the following effects can be expected.

(a) Provision of Index Representing Reliability for Quantitative Value

The present invention provides a score obtained from a tendency of an apex of a peak or a start point or an end point of a baseline with respect to a measured value of a height or an area obtained in peak detection. For example, when an evaluated value of a start point of a baseline is low, a shape of a peak changes due to influence of a contaminant. The measured value is converted into a concentration using a calibration curve. Therefore, a status where the score of the start point is low with respect to the value of a concentration of a target component can be warned and displayed.

In a case where a range where a quantitative value should be present is assumed, when there is a warning in a state where a concentration close to a boundary value of the range is detected, a user can take a countermeasure such as checking of a chromatogram or remeasurement using another apparatus.

In addition, even when tailing of a peak occurs at a high concentration, the determination on whether the result of quantitative analysis is appropriate can be represented by a numerical value.

(b) Provision of Information for Apparatus Trouble

In the present invention, in a case where concentrations are different, an abnormality for an apex of a peak or a start point or an end point of a baseline can be detected based on an appropriate state thereof. For example, when an abnormality is abruptly detected only for a specific minor component, contamination derived from an apparatus installation environment is doubted. When an abnormality is detected over all the minor components, a countermeasure such as cleaning of the apparatus can be taken.

(c) Automation of Replacement of Column or the Like

An evaluated value for an apex of a peak or a start point or an endpoint of a baseline provided by the present invention may function as an index representing a replacement time of a column in a chromatograph, an eluent, or the like. For example, a rough indication that a time of an apex, a start point, or an end point is advanced due to deterioration of a column or the like may be obtained, and a countermeasure such as replacement with a new column may be considered.

(d) Automation of Remeasurement

By providing the index as described above, a reduction in the burden of a user, for example, automatic remeasurement of a sample for which an abnormality is detected can be implemented.

(B) Improvement of Determination Accuracy

The peak detection is basically the process of selecting a suitable candidate from a limited number of baseline candidates. Accordingly, by providing an evaluated value having high accuracy for each of the candidates, peak detection can be executed with higher accuracy. A measured value of an area or a height obtained in peak detection is directly converted into a concentration based on a calibration curve. Therefore, the accuracy of the peak detection is directly linked to improvement of determination accuracy.

In the present invention, a tendency of an apex of a peak or a start point or an end point of a baseline is acquired from detection results of peaks having different areas or heights obtained from samples having different concentrations, and the tendency is applied to peak detection. Therefore, improvement of determination accuracy can be expected.

(C) Effect of Combination with Existing Peak Detection

In the present invention, basically, an evaluated value is provided for an apex of a detected peak or a start point or an end point of a baseline. This method can be applied independently to the peak detection of the related art. That is, the result can be evaluated as a numerical value irrespective of the peak detection. The present invention can also be applied to the evaluation of the peak detection result in consideration of a peak detection algorithm in the related art.

When an algorithm of acquiring an area or a height changes in order to improve determination accuracy, massive correction work is required, and a numerical value is likely to slightly increase as compared to a measured value in the past. While avoiding the risk, the peak detection can be evaluated.

(D) Reduction of Analysis Resources

For example, in a study relating to a metabolite of chemicals, a researcher needs to know states of localization of a target component in various biological tissues, a temporal change in concentration in blood or urine. To that end, a sample in which the target component is present in a relatively high concentration or a sample in which the target component is present in a very small amount is desirable as an analysis target. However, when the concentration of the target component in the sample is not a measurable concentration range, it is necessary to change a condition of a pre-treatment such as extraction or condensation to optimize an analysis condition. When a measurable concentration range is wide and peak detection can be executed in the wide range, a wider range of samples can be analyzed, the amount of samples and the time required for examination can be reduced.

Hereinabove, the effects of the present invention have been described.

The present invention provides a new evaluated value for peak detection and contributes to improvement determination accuracy, automation of the apparatus, reduction in resources, and the like. In addition, the present invention can be combined with a technique of the related art. Even in this case, the effects of the present invention can be obtained.

In all the Examples 1 to 3, a height can also be used instead of an area. When the influence of a contaminant is high for a peak, a height may have a better relationship with a concentration and a measured value than an area.

In addition, an area or a height and times of an apex, a start point, and an endpoint are obtained. However, an area of a start point side of a peak and an area of an end point side of a peak can also be used instead of the times of the start point and the end point.

In Examples 1 to 3 of the present invention, the process flows are shown such that a plurality of samples are measured and provided for the peak detection. However, flows of executing processes such that measurement and peak detection are executed for each of samples and a score function is determined for the collected peak detection results can also be considered. This configuration is also in the range of the example of the present invention.

The present invention described above using various examples contributes to more accurate peak detection or improvement of determination accuracy using the method focusing on the relationship between an area or a height and a value such as a time obtained from an apex of a peak or a start point or an end point of a baseline.

REFERENCE SIGNS LIST

101: process step for components having different concentrations
102: process step for component having unknown concentration
201: liquid chromatograph (LC)
202: mass spectrometer (MS)
203: data processing device
205: LC control device
206: MS control device
207: display device
208: keyboard
301, 302, 303, 801: chromatogram
501: maximum time 502: minimum time
503: maximum frequency time
701: maximum time at which end point is likely to be detected
702: minimum time at which end point is likely to be detected
802: end point of baseline of chromatogram
803: noise region
804: average value of noise signals
811: chromatogram from which noise is excluded
812: starting point of region that is likely to be end point
1201: line segment connecting endpoint and maximum time
1202: line segment connecting endpoint and minimum time
1203: line segment connecting end point and maximum frequency time
1501: process block of chromatograms having different concentrations (function generation block)
1502: process block of chromatogram having unknown concentration (function application block)
2001: process step of analyzing tendency of peak detection result from measurement of plurality of samples
2002: process step of evaluating peak detection result with respect to sample measurement
2101: line representing tendency of apex
2102: line representing tendency of start point
2103: line representing tendency of end point
2104: area section for obtaining maximum time, minimum time, and maximum frequency time
2201: baseline end point corresponding to maximum time
2202: baseline end point corresponding to minimum time
2203: baseline end point corresponding to maximum frequency time

The invention claimed is:

1. A chromatography mass spectrometer that separates a target component of a sample for mass spectrometry, comprising:
    an ion source configured to ionize the sample;
    a mass spectrometer unit configured to select ions having a predetermined mass-to-charge ratio;
    a detector configured to detect a signal of ion content from the mass spectrometer; and
    a data processor coupled to the detector, programmed to:
    acquire the signal of the ion content output by the detector,
    calculate a score function representing a start point and an end point of a baseline and an apex of a peak with respect to a detection time at which a sample having a known component concentration is detected, wherein the apex of the peak is a maximum ion concentration between start point and the end point, and a line connecting the start point and the end point is the baseline,
    obtain a measured value of an area or a height of the known component concentration, the area is a portion above the baseline and below the apex of the peak,
    calculate a score value for a detection time at which a sample having an unknown component concentration is detected,
    calculate a measured value of an area or a height of the component concentration using the calculated score function, and
    select a peak of the sample having the unknown component concentration based on the calculated score value.

2. The chromatography mass spectrometer according to claim 1,
    wherein the score function is a function based on frequency information that is obtained from peak detection results derived from samples having different component concentrations.

3. The chromatography mass spectrometer according to claim 1,
    wherein the score function is a function that is determined based on an appearance probability of a valley obtained from a peak and a noise region on a chromatogram between the start point and the end point of the baseline.

4. The chromatography mass spectrometer according to claim 1,
    wherein the data processing unit extracts a plurality of peak candidates with respect to the measured value and selects a true peak having a highest score from the peak candidates.

5. A method of chromatography mass spectrometry of separating a target component of a sample for mass spectrometry, the method comprising:
    calculating a score function representing tendencies of a start point and an end point of a baseline and an apex of a peak with respect to a detection time at which a sample having a known component concentration is detected and a measured value of an area or a height of the component concentration, wherein the apex of the peak is a maximum ion concentration between start point and the end point, a line connecting the start point and the end point is the baseline, and the area is a portion above the baseline and below the apex of the peak;
    calculating a score value for a detection time at which a sample having an unknown component concentration is detected and a measured value of an area or a height of the component concentration using the calculated score function; and
    selecting a peak of the sample having the unknown component concentration based on the calculated score value.

6. A method of chromatography mass spectrometry according to claim 5,
    wherein the score function is a function based on frequency information that is obtained from peak detection results derived from samples having different component concentrations.

7. A method of chromatography mass spectrometry according to claim 5,
    wherein the score function is a function that is determined based on an appearance probability of a valley obtained from a peak and a noise region on a chromatogram between the start point and the end point of the baseline.

8. A method of chromatography mass spectrometry according to claim 5,
    wherein a plurality of peak candidates are extracted with respect to the measured value and selects a true peak having a highest score from the peak candidates.

* * * * *